(12) United States Patent
Meersma et al.

(10) Patent No.: US 11,243,824 B1
(45) Date of Patent: Feb. 8, 2022

(54) CREATION AND MANAGEMENT OF LIVE REPRESENTATIONS OF CONTENT THROUGH INTELLIGENT COPY PASTE ACTIONS

(71) Applicant: Microsoft Technology Licensing, LLC, Redmond, WA (US)

(72) Inventors: Brian Daniel Meersma, Redmond, WA (US); David Simon Carpenter, Seattle, WA (US); Jonathan Seth Kaufthal, Seattle, WA (US); Nimisha Gupta, Bellevue, WA (US); Kyle David Ryan, Sammamish, WA (US); Sophia Isabel Vennix, Washington, DC (US); Margaret Cui Liu, Mercer Island, WA (US); Gregory Alan Howard, Kirkland, WA (US); Maya Rodrig, Seattle, WA (US); Daniel Paul Costenaro, Kirkland, WA (US); Mara Beth Fortini, Sammamish, WA (US); Cosmin Catrinescu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/231,270

(22) Filed: Apr. 15, 2021

(51) Int. Cl.
*G06F 17/00* (2019.01)
*G06F 9/54* (2006.01)
(Continued)

(52) U.S. Cl.
CPC ............ *G06F 9/543* (2013.01); *G06F 3/0486* (2013.01); *G06F 3/04842* (2013.01);
(Continued)

(58) Field of Classification Search
CPC .... G06F 9/543; G06F 3/04842; G06F 40/166; G06F 3/0486; G06F 40/134; G04L 9/543
(Continued)

(56) References Cited

U.S. PATENT DOCUMENTS

| | | | |
|---|---|---|---|
| 9,769,104 B2 * | 9/2017 | Appelman | G06Q 10/10 |
| 2004/0153504 A1 * | 8/2004 | Hutchinson | G09B 5/08 |
| | | | 709/204 |

(Continued)

OTHER PUBLICATIONS

Anderson, 'Imagine OLE reinvented for the web and that's 90% of Microsoft's Fluid Framework', Nov. 2019, www.theregister.com/2019/11/05/microsoft_previews_fluid_framework (Year: 2019).*

(Continued)

*Primary Examiner* — Stephen S Hong
*Assistant Examiner* — Matthew J Ludwig

(57) ABSTRACT

Non-limiting examples of the present disclosure enable creation and management of representations of content through the execution of copy actions, paste actions or a combination thereof. An indication of a copy action is received that copies a content portion. The copy action is analyzed to generate a (live) representation of the content portion. Other examples of representations are also generatable including a static representation and/or a live non-editable representation. As an example, a live representation is an editable and synchronized representation of the content portion that is synchronized with original source content. The live representation comprises a selectable data link that links back to the original source content and an editable representation of the content portion. In response to receiving an indication of a paste action, the live representation of the content portion is automatically rendered inline within a graphical user interface of a host application/service endpoint.

20 Claims, 11 Drawing Sheets

(51) Int. Cl.
  *G06F 3/0484* (2022.01)
  *G06F 3/0486* (2013.01)
  *G06F 40/166* (2020.01)
  *H04L 29/08* (2006.01)
  *G06F 40/134* (2020.01)
  *G06F 16/176* (2019.01)
(52) U.S. Cl.
  CPC .......... *G06F 16/176* (2019.01); *G06F 40/134* (2020.01); *G06F 40/166* (2020.01); *H04L 67/06* (2013.01)
(58) Field of Classification Search
  USPC .................................................. 715/255, 769
  See application file for complete search history.

(56) References Cited

U.S. PATENT DOCUMENTS

| | | | | |
|---|---|---|---|---|
| 2011/0161425 A1* | 6/2011 | Xiao | .................... | G06F 16/2358 709/206 |
| 2012/0130954 A1* | 5/2012 | Hood | ..................... | G06Q 10/10 707/640 |
| 2012/0250780 A1* | 10/2012 | Shen | .................... | H04B 7/0413 375/285 |
| 2012/0284635 A1* | 11/2012 | Sitrick | .................... | G06T 11/60 715/751 |
| 2015/0370769 A1* | 12/2015 | Pereira Filho | ...... | G06F 21/6209 726/28 |
| 2017/0083211 A1 | 3/2017 | Ramkumar et al. | | |
| 2017/0353466 A1 | 12/2017 | Weaver et al. | | |
| 2018/0121038 A1 | 5/2018 | Bliss et al. | | |
| 2018/0247243 A1* | 8/2018 | Moolman | ................. | G06F 8/38 |
| 2018/0260366 A1 | 9/2018 | Brasket et al. | | |
| 2018/0337877 A1 | 11/2018 | Lane et al. | | |
| 2019/0147402 A1* | 5/2019 | Sitrick | ................. | H04M 3/567 705/301 |

OTHER PUBLICATIONS

Fisher, 'Your Guide to Collaborative Document Editing with Google Docs', Jul. 18, 2018, mojomedialabs (Year: 2018).*

Warren, Tom, "Microsoft's New Fluid Office Document is Google Docs on Steroids", Retrieved from: https://www.theverge.com/2020/5/19/21260005/microsoft-office-fluid-web-document-features-build, May 19, 2020, 11 Pages.

"Non Final Office Action issued in U.S. Appl. No. 17/231,236", dated Dec. 7, 2021, 14 Pages.

* cited by examiner

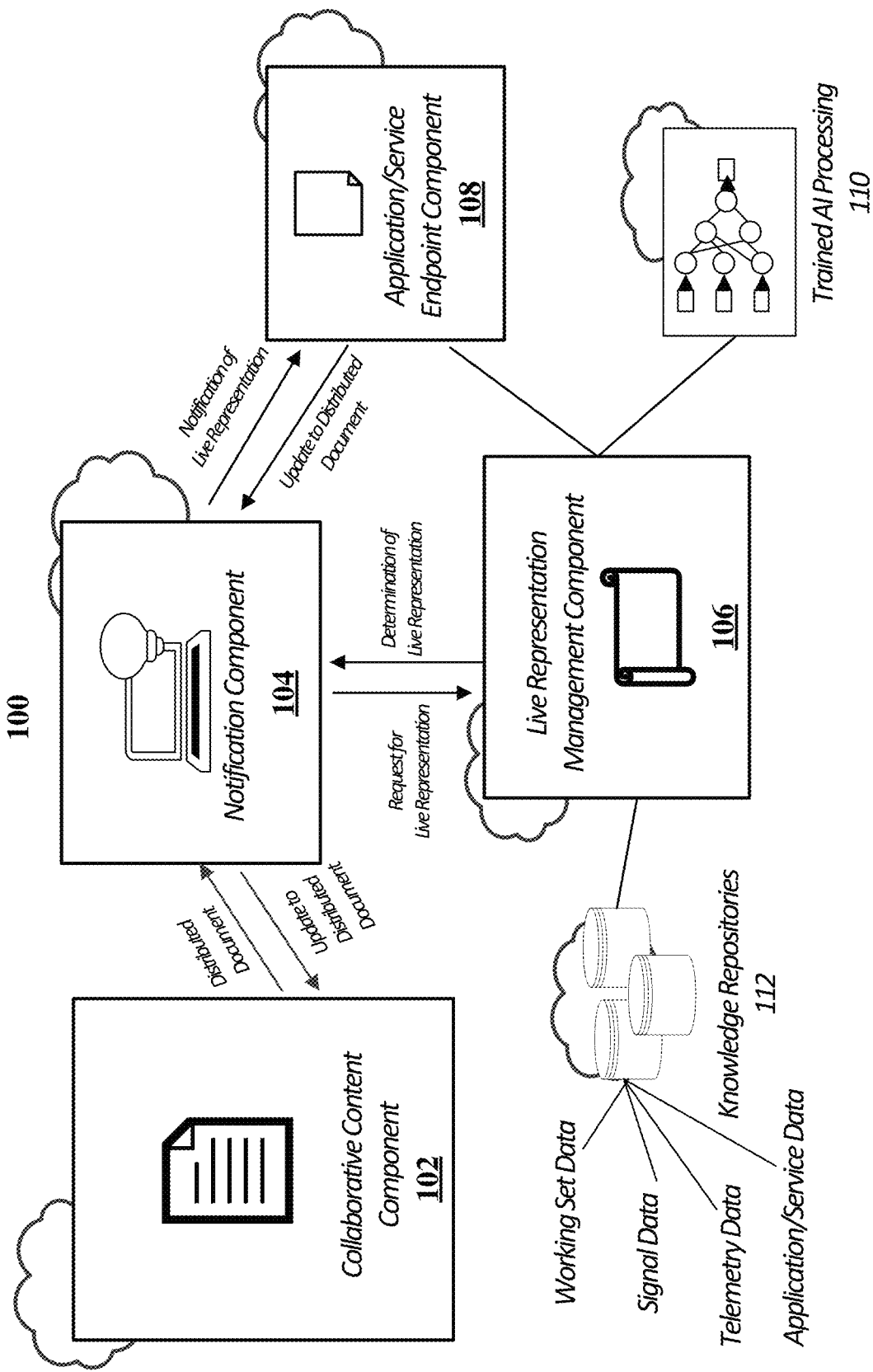

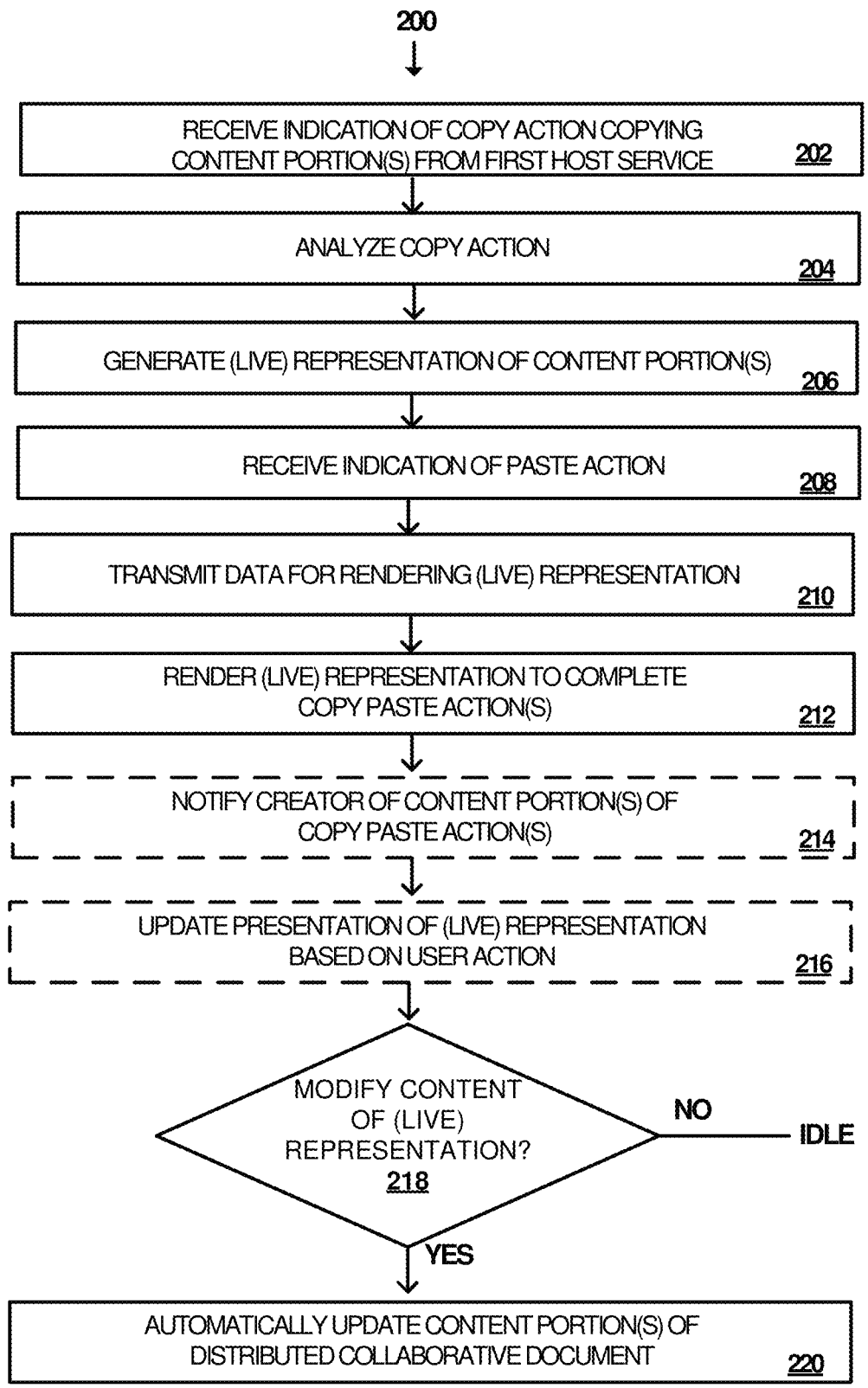

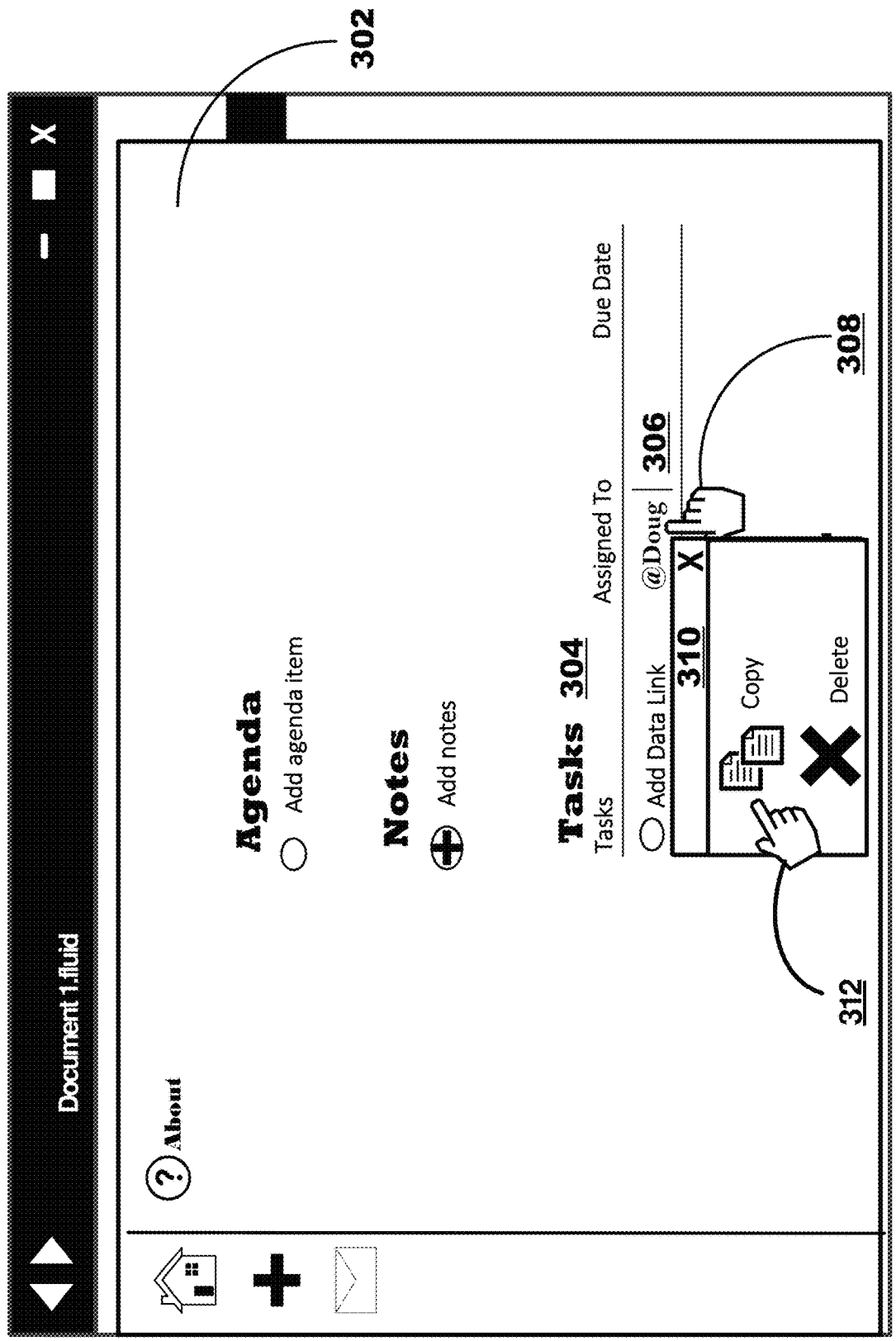

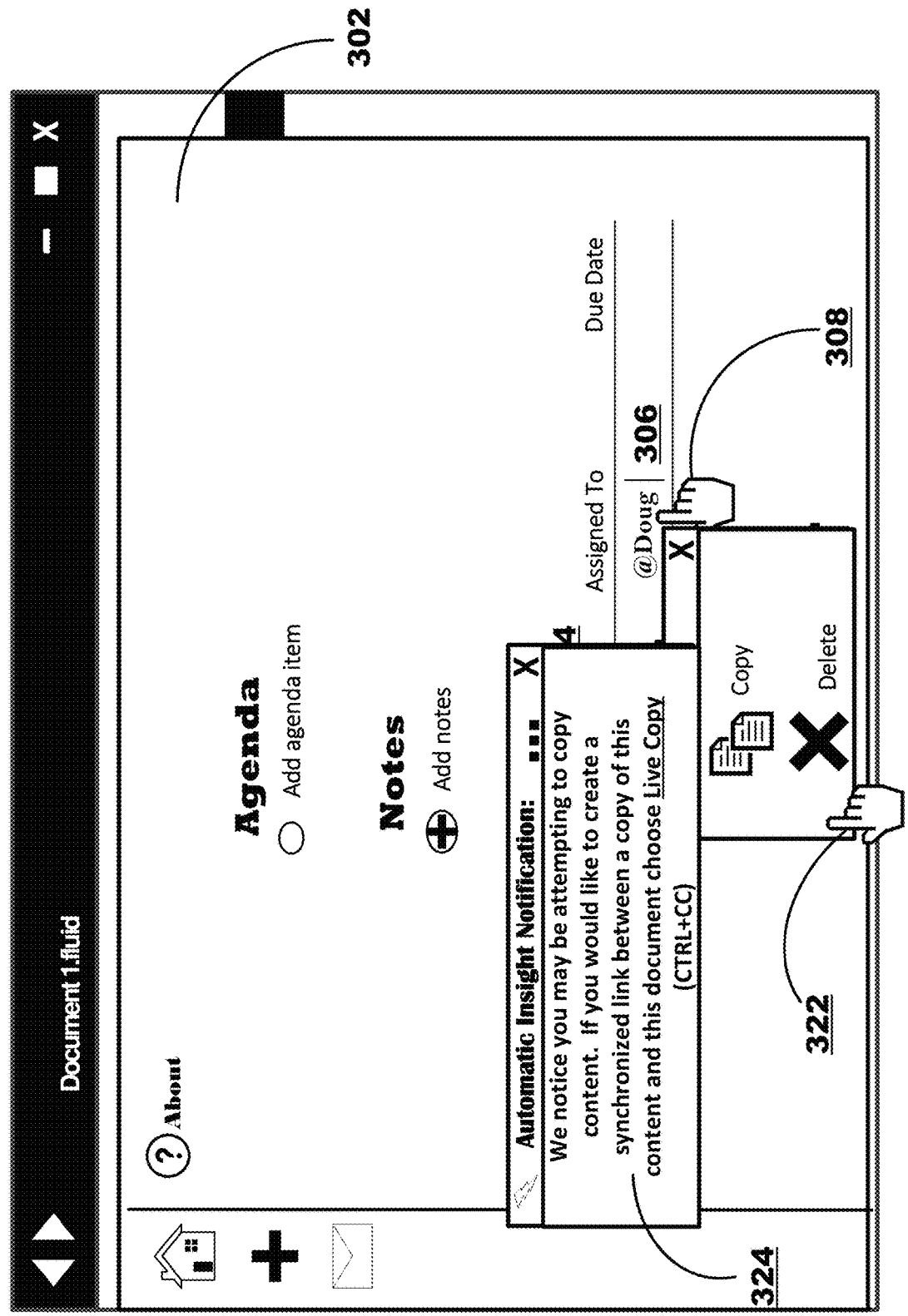

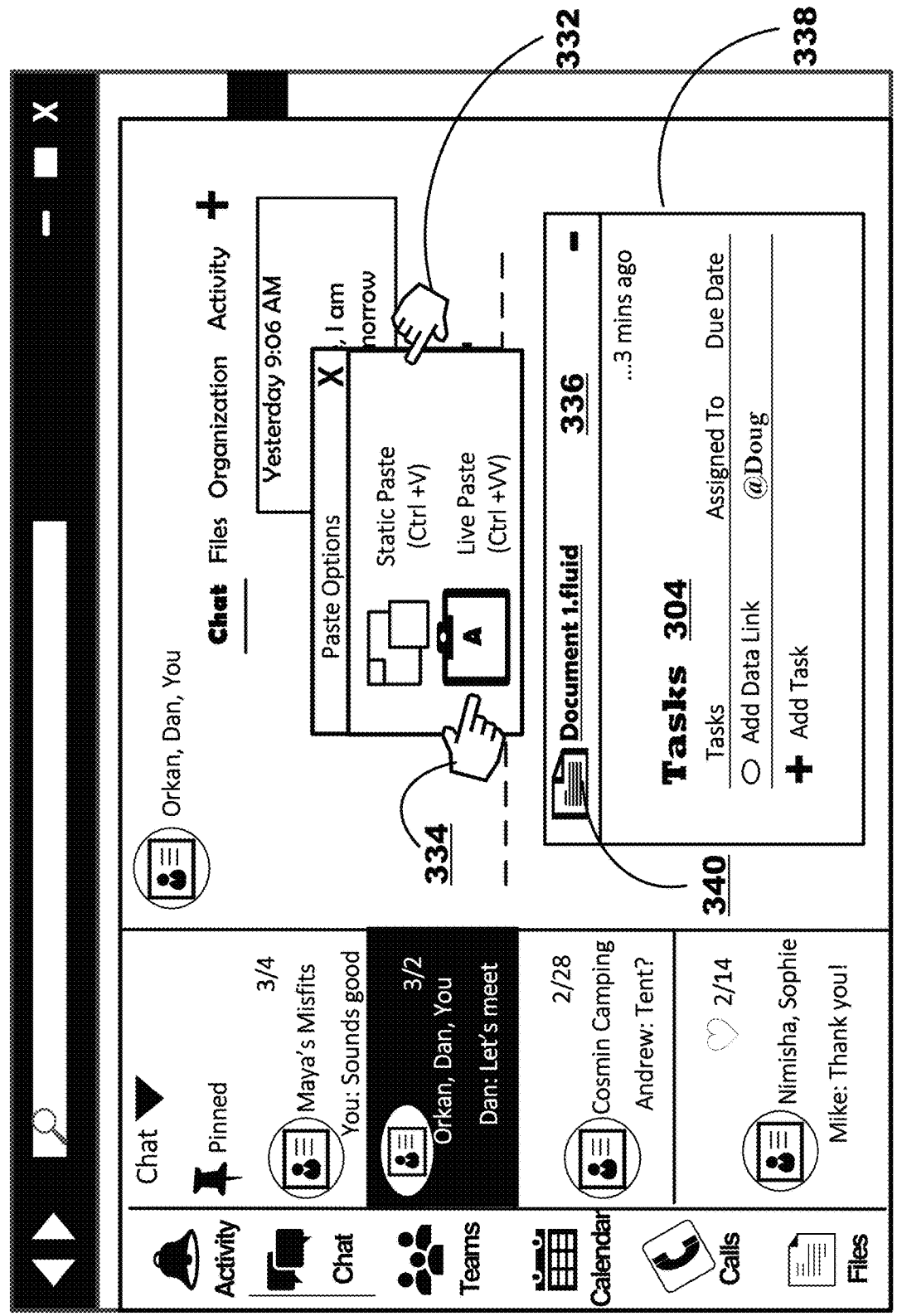

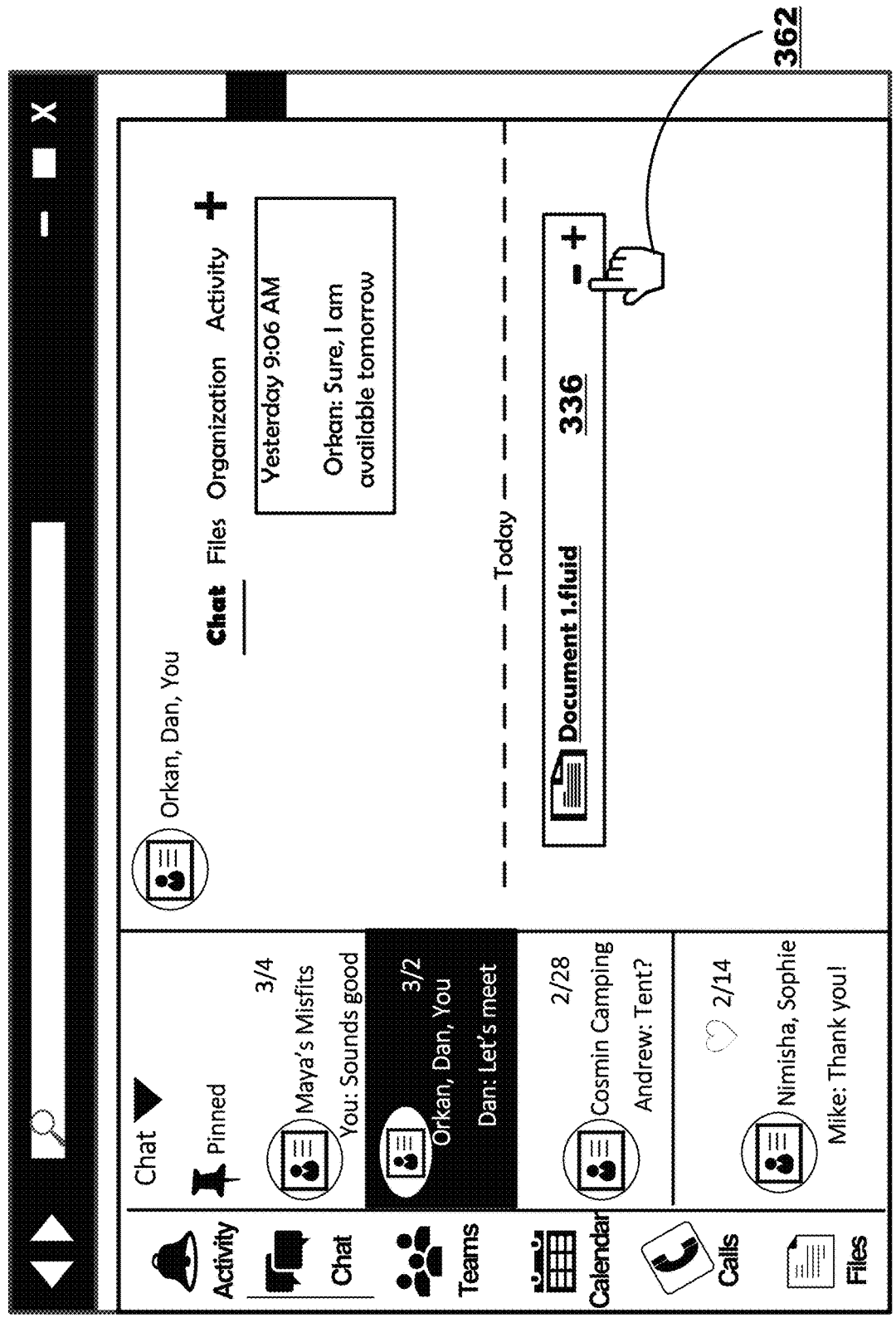

370

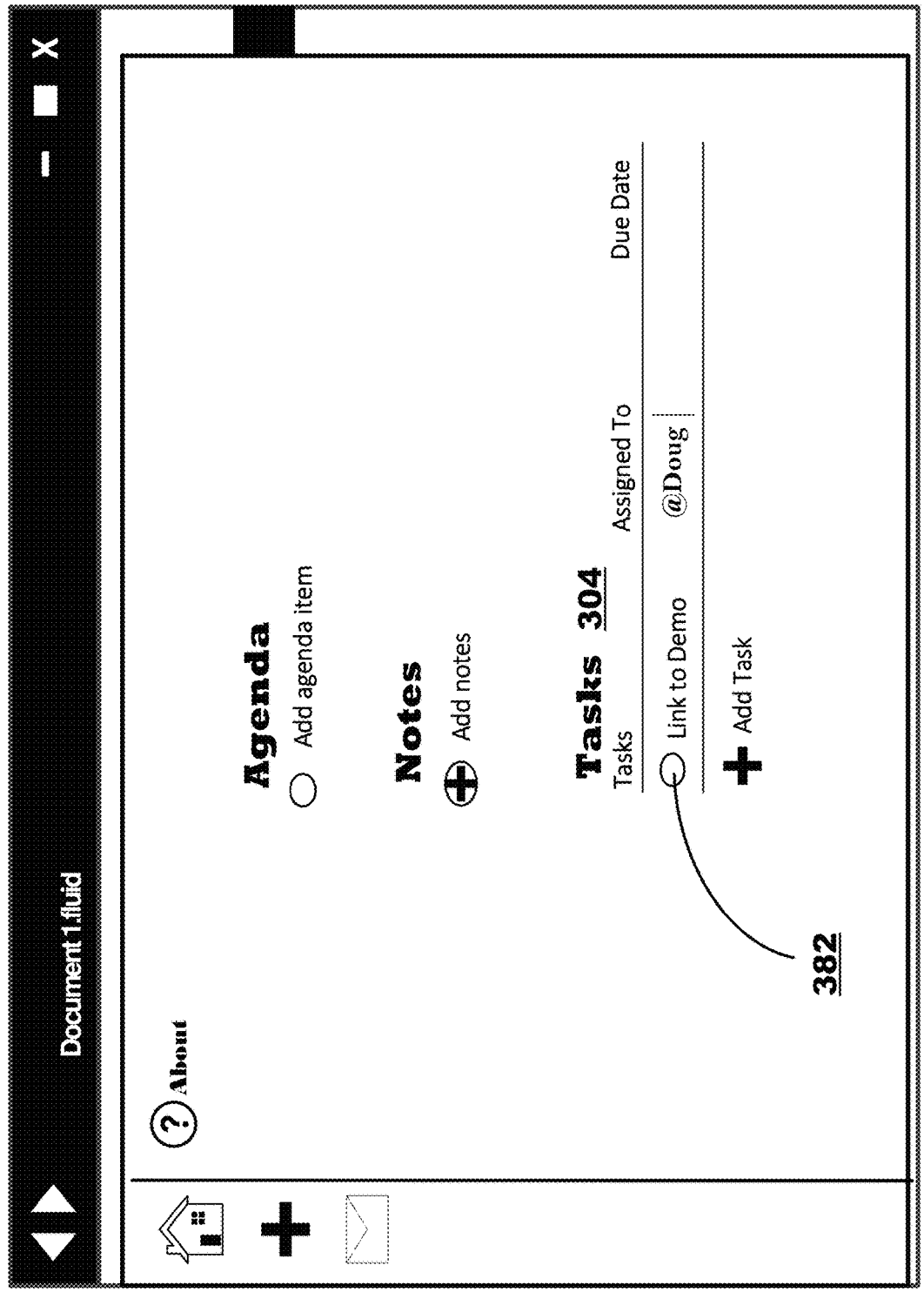

390

CREATION AND MANAGEMENT OF LIVE REPRESENTATIONS OF CONTENT THROUGH INTELLIGENT COPY PASTE ACTIONS

BACKGROUND

Traditionally, operations for copying and pasting content create a forked representation of that content, where an original source of the content does not remain synchronized with a version of that content which is pasted in another location. For example, if a user copies content from a word processing document and pastes that content in an email document, the word processing document will have the original content and email document will have a forked version of that content. Any changes made to the content in the email document will not change the original content within the word processing document. Forked representations of content not only hinder processing efficiency of both computing devices and associated users but also require that multiple different applications/services and documents be concurrently accessed to synchronize changes between different versions of the content. As such, processing for copying and pasting stands to be improved to enable synchronization between the different version of content.

Another technical challenge that arises with respect to copying and pasting content is the limited options when pasting copied content in another location/electronic document. Commonly, options for pasting copied content are limited to either: 1) an option that keeps a source formatting of the content; or 2) an option that pastes only the data of that content. However, as content collaboration is becoming more common, users are encountering different technical scenarios where they require more control over the formatting by which content is copied and pasted. In some technical instances, a user might even need to change formatting in real-time during editing. Therefore, management of copying and pasting of content stands to be improved.

Yet another technical issue that arises in collaborative scenarios pertains to the lack of contextual information surrounding content that is copied from one source and pasted in another. As many documents are accessed collaboratively, users may be copying content and pasting that content across any number of different documents. However, traditional actions for copying and pasting content do not provide insights that help users understand how content reached the state that it is currently in.

SUMMARY

For resolution of the above identified technical problems and other reasons, the present disclosure is directed to creation and management of representations of content through the execution of copy actions, paste actions or a combination thereof. An indication of a copy action is received that copies a content portion. The copy action is analyzed to generate representation of that content, for example, providing a live representation of the content portion. Representations of content that are generated by the present disclosure comprise: a live representation, a live (non-editable) representation; and a static representation. A live representation is an editable and synchronized representation of the content portion that is synchronized with original source content. The live representation comprises a selectable data link that links back to the original source content and an editable representation of the content portion. In response to receiving an indication of a paste action, the live representation of the content portion is automatically rendered inline within a graphical user interface of a host application/service endpoint. The live representation is then manageable through the host application/service endpoint, where updates are automatically synchronized with the original source content. Any updates to the content of live representation or the original source content automatically triggers an update to displayed content at either location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary system diagram of components interfacing to enable creation and management of live representations of content relative to execution of copy paste actions, with which aspects of the present disclosure may be practiced.

FIG. 2 illustrates exemplary method related to creation and management of live representations of content relative to execution of copy paste actions, with which aspects of the present disclosure may be practiced.

FIGS. 3A-3H illustrate exemplary processing device views providing user interface examples of an improved user interface that is adapted for intelligent management of copy paste actions, with which aspects of the present disclosure may be practiced.

DETAILED DESCRIPTION

Figure 3D:
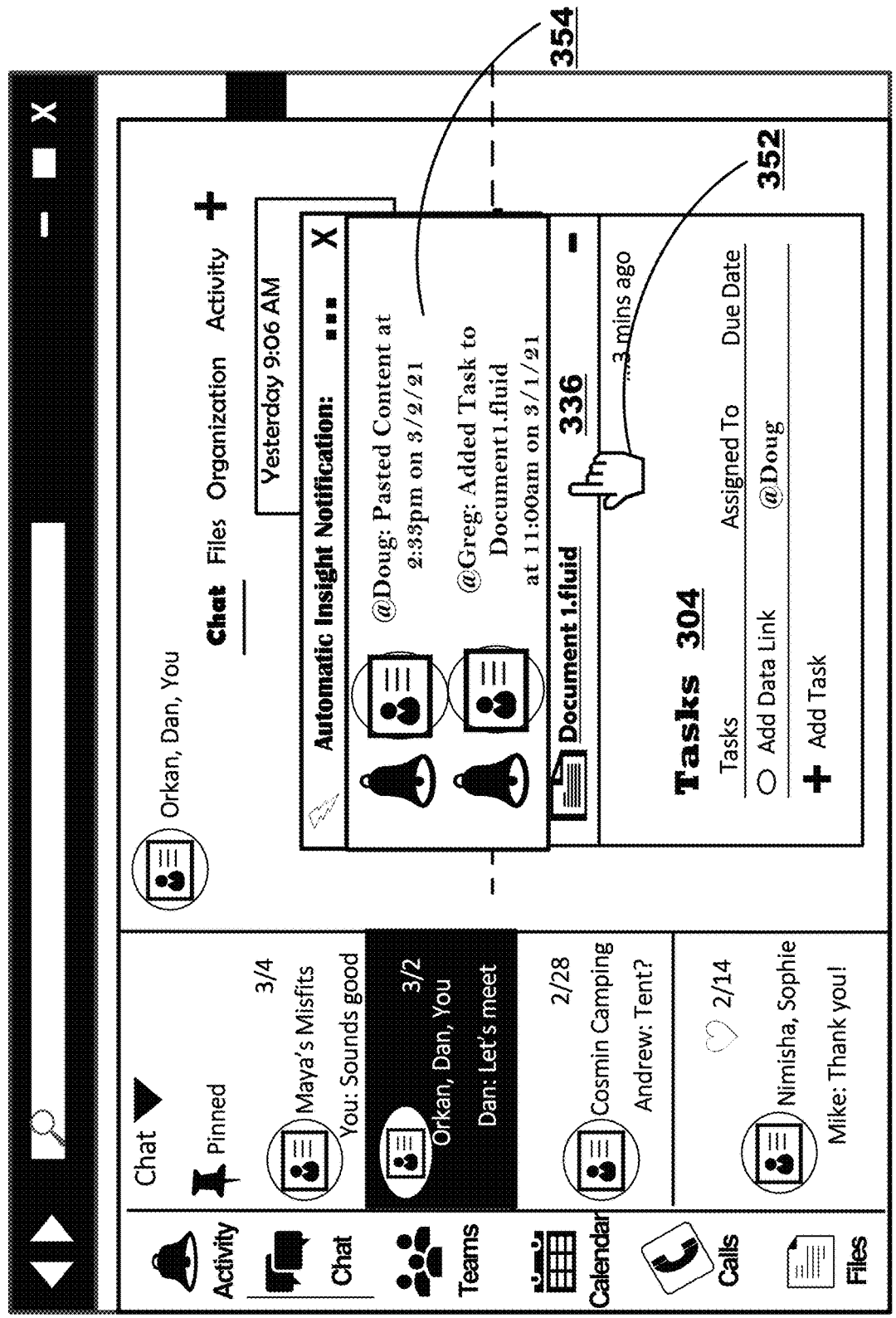

As identified in the foregoing description, non-limiting examples of the present disclosure enable creation and management of representations of content through the execution of copy actions, paste actions or a combination thereof. The term copy paste action is intended to cover technical instances where an execution of a copy action (one or more actions) is linked to the execution of a paste action (one or more actions) to complete a copy and paste of one or more content portions.

An indication of a copy action is received that copies one or more content portions. The copy action is analyzed to generate a (live) representation of the content portion(s). For example, the copy action is analyzed to determine a user account associated with the copy action and a navigation parameter that identifies a content sub-range of content that is to be copied from an electronic source. As a non-limiting example, content may comprise a component of a distributed collaborative canvas that is provided through a collaborative framework (e.g., MICROSOFT® FLUID®). However, processing described herein is applicable to enhance copy paste actions associated with any type of content and/or content portions. The copy action is analyzed to generate representation of that content, for example, providing a live representation of the copied content portion(s). While some examples of the present disclosure improve efficiency by generating a live representation of a content portion upon execution of a copy action, it is also to be recognized that a live representation of a content portion can be generated upon execution of a paste action (or a completion of a copy paste action). Other types of representations can also be generated using processing of the present disclosure. For instance, representations of content that are generated by the present disclosure comprise: a live representation, a live (non-editable) representation; and a static representation.

A live representation is an editable and synchronized representation of the content portion(s) that is synchronized with a version of the content portion(s) associated with the electronic source (e.g., original source content). The live representation comprises a selectable data link that links to the original source content (e.g., the distributed collaborative canvas) and an editable representation of the content portion(s) that is associated with the sub-content range of the navigation parameter. Essentially, the live representation provides an editable version of the content portion(s) that is synchronized with original source content (e.g., the distributed collaborative canvas). In response to receiving an indication of a paste action, thereby completing a copy paste action, the live representation of the content portion(s) is automatically rendered inline within a graphical user interface (GUI) of a host application/service endpoint. Any updates to the content of live representation or the original source content automatically triggers an update to displayed content at either location. For instance, an indication of an update to content of the live representation is received. In response to receiving the indication of the update to the content of the live representation, an update is automatically applied to the content to original source content (e.g., the distributed collaborative canvas).

Additionally, a viewing state of a live representation of content is modifiable to streamline with other content that is presented inline within a host application/service endpoint. Inline, as referenced in the present disclosure, is intended to refer to technical instances where data is embedded as a content portion (data object), among other content portions, that is displayable within a rendering of a host application/service and associated endpoints. For instance, a GUI notification and associated data (e.g., live representation), are embedded components that is appears as content portions within a GUI of a host application/service endpoint. Non-limiting examples of content presented inline are illustrated in FIGS. 3A-3H. As an example, an improved GUI of a host application/service is adapted to enable users to toggle control over expanding/collapsing the live representation. Uniquely, a novel visual presentation of the live representation is presented in a collapsed view. For instance, a collapsed view of the live representation removes, from display, the content of the live representation thereby displaying only the selectable data link associated with original source content (e.g., the distributed collaborative canvas). This enables users to visually recognize that content from one host application/service (e.g., associated with a collaborative framework) is embedded within another host application/service endpoint while still providing a quick way to link back to the original source content. This could also be done using non-GUI input. For example, a trained AI model is configured to determine, based on the type of content selected, a form for rendering a representation of content (e.g., collapsed or expanded) as well as the location where the content will be pasted, or other factors to automatically pre-select an option for the user. In further instances, users can set sharing permissions pertaining to a live representation. For instance, GUI features may be presented through an adapted GUI of a host application/service that enable users to control sharing permissions related to sharing and editing activity associated with a live representation. As an example, a user may wish to have a live representation editable through one host application/service but static representations of content in other locations so that other untrusted users are unable to edit the content. In further examples, a live (but not editable) representation is able to be generated and synchronized across different host application/service endpoints.

The present disclosure further enables users to toggle between a static representation of content, a live representation of content and/or alternative versions of a live representation (e.g., non-editable). For instance, a host application/service, and associated GUI, is configured to recognize commands and/or present GUI elements that enable users to execute a traditional copy paste action, a live copy paste action or toggle therebetween. For ease of understanding, a live copy paste action is intended to refer to technical instances where a live representation of content is created that is editable and synchronized with original source content. Using a live copy paste action, users can embed content portions in other locations and/or host applications/service endpoints, to manage content in a single GUI without requiring multiple applications/services to be concurrently executing. For reference, the present disclosure also refers to a live copy action and/or a live paste action, which are intended to describe portions of the live copy paste action for creation of a live representation or alternative version of a live representation (e.g., non-editable). In one example, a new keyboard command (e.g., "Control+CC" or "Control+Shift+C") is introduced that automatically applies a live copy action of one or more content portions. When a user goes to paste the copies content, a live representation of the content portion(s) is automatically created. In further instances, a new keyboard command (e.g., "Control+VV" or "Control+Shift+V") is created that automatically executes a live paste action thereby pasting a live representation of content or alternative version of a live representation (e.g., non-editable). Live copy paste actions dovetail with traditional copy paste keyboard shortcuts, where a user can select whether to create a static representation (e.g., by using a traditional keyboard command such as "Control+C" or "Control+V") or create a live representation (e.g., using new keyboard commands "Control+CC" and "Control+VV" or other programmed keyboard shortcuts). Additionally, GUI of host applications/services and associated endpoints are further adapted to provide GUI elements that enable users to toggle control over copy paste actions. For instance, GUI menus are presentable to users (e.g., based on interactions with GUIs via voice input, gestures of device actions) that allow users to toggle between static representations of content and live representations of content (including alternative live representations having different editing permissions).

Furthermore, the present disclosure further helps users keep track of different versions of content (e.g., the original source content relative to representations presented though various host applications/service endpoints) by enabling creation of a notification association. The notification association is configured to automatically create a rule that transmits a notification to a creator of the original source content (and/or other permitted users) when a copy paste action occurs for that content and/or a representation of the original source content is updated. This helps keep the creator of the content in the loop as to when/how content (e.g., components of a distributed collaborative canvas) is updated, especially in collaborative scenarios. In one example, a first user account executes a copy paste action on a content portion of a distributed collaborative canvas. A second user account is identified as the creator of the content portion of the distributed collaborative canvas, and that second user account is automatically notified of a completion of the copy paste action by the first user account. The modality and type of notification can be set by users when creating a notification association or alternatively is automatically set by developers. For instance, an email notification or a message notification is sent to the creator of the content portion. The present disclosure is also configured to automatically create a non-exhaustive list of locations where the content was copy/pasted. For example, if the content is pasted from a distributed collaborative canvas (or electronic document), into several different chat conversations, the creator of the content, in some instances, could be displayed a list of which chats included different versions (e.g., live representations, static representations, etc.) of the content. The present disclosure is further configured to enable the original creator of the content could have the ability to revoke access to the live pasted content or could revoke access to the content based on where the content was pasted (e.g., if the content was pasted in error into a chat conversation with participants from outside of a company).

Moreover, a generated representation (e.g., a live representation) may comprise contextual data that keeps users up to date regarding a state of the live representation and/or the original source content. Contextual data is presentable within a representation and/or as automatic data insights that are presented through a GUI of a host application/service endpoint in association with a live representation. Trained artificial intelligence (AI) processing may be executed to create data and/or data insights pertaining to content including content presented in a live representation and about the copy paste action. As an example, an indication of a hover action is received, where a GUI element providing data insight(s) is automatically rendered for a user. Non-limiting examples of data that is included in a data insight comprises but is not limited to: contextual data identifying a history of the copy paste action that comprises: data identifying the user account that executed the copy paste action a timestamp associated with the copy paste action; and contextual data identifying a creation and/or edit history of the content portion (e.g., of the distributed collaborative canvas), among other examples.

Exemplary technical advantages provided by processing described in the present disclosure comprise but are not limited to: improved server-side processing for management of copy and/or paste actions including the implementation of live copy paste actions; processing operations that intelligently manage states of content during copy and/or paste actions including toggling between a live representation (or versions thereof) for copied content and a static representation of copied content; generation of exemplary live representations of content that are embeddable within a variety of host application/service endpoints while remaining synchronized with original source content; automated generation of data pertaining to the management of content and copy paste actions including the automatic generation and presentation of data insights associated with various representation of copied content; introduction of novel keyboard commands as shortcuts for implementation of live copy paste actions; an improved GUI, integrated within a variety of applications/services and associated endpoints, that is adapted to enable front-end rendering of processing of the present disclosure; application of specific purpose computing to improve management of copy paste actions; application of trained AI processing to enhance processing described herein including generation of automated data insights pertaining to exemplary representations of copied content; improved processing efficiency (e.g., reduction in processing cycles, saving resources/bandwidth) for computing devices when implementing live copy paste actions and generation of representations including live representations; reduction in latency through efficient processing operations that improve management of copy paste actions; implementation of a novel live representation management component that is further configured to interface with a plurality of other components to enable manage presentation of live representations across different host application/service endpoints; and improving usability of host applications/services for users via integration of processing described herein, among other technical advantages.

FIG. 1 illustrates an exemplary system diagram 100 of components interfacing to enable creation and management of live representations of content relative to execution of copy paste actions, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in method 200 (FIG. 2) as well as processing described in and associated with processing device views of FIGS. 3A-3H and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises a collaborative content component 102; a notification component 104; a live representation management component 106; an application/service endpoint component 108; a component for implementation of a programmed software module and/or trained AI processing 110; and knowledge repositories 112.

A collaborative content component 102 is one or more computer components (hardware, software or a combination thereof) configured to enable management of access to a distributed collaborative canvas. A distributed collaborative canvas is a workspace that is stored and accessible via a distributed data storage allowing multiple users to work together within the workspace (e.g., on the same document) at the same time. A distributed collaborative canvas is rendered in a format that is supported by a collaborative framework providing technical support for managing components as individual data objects as well as aggregation within a distributed collaborative canvas (e.g., distributed collaborative document/distributed electronic document). An exemplary collaborative framework may be an open-source collaborative framework configured to enable integration of exemplary components in a format that is understandable by a variety of applications/services and/or distributed software platforms to enable cross-service usage and extensibility. A non-limiting example of an open-source collaborative framework is the MICROSOFT® FLUID® framework. Implementation of such a framework to enable execution of processing operations described herein is known to one skilled in the field of art. Above what is traditionally known is the processing described herein pertaining to the automatic generation of notifications and management of the same across different host application/service endpoints. As previously mentioned, an example of a distributed collaborative canvas is an electronic document, rendered from a representation of the distributed collaborative canvas, that is stored on a distributed storage and collaboratively accessible by two or more users. However, it is to be recognized that a distributed collaborative canvas is not required to be formatted as a single electronic document. An example of a distributed collaborative document is a MICROSOFT® FLUID® document that comprises a plurality of components in aggregation, where individual components of the document are also treatable as individual data objects (e.g., individual content portions). Components of a distributed collaborative document are rendered entirely inline in an experience in which a component is embedded in. For instance, a main (original) source of a distributed collaborative document is managed by a file hosting service (e.g., ONEDRIVE®) and/or a collaborative file management platform (e.g., SHAREPOINT®), that further synchronizes stored content with host applications/services of a distributed software platform. Inline, as referenced in the present disclosure, is intended to refer to technical instances where data is embedded as a content portion (data object), among other content portions, that is displayable within a rendering of a host application/service. For instance, a GUI notification and associated data (e.g., live representation), are embedded components that is appears as content portions within a GUI of a host application/service endpoint. Non-limiting examples of content presented inline are illustrated in FIGS. 3A-3H.

In addition to managing data storages related to content of a distributed collaborative canvas, the collaborative content component 102 is adapted to manage mappings of components (e.g., content portions) to distributed collaborative canvas (and/or related document representations). As previously referenced, components of a distributed collaborative canvas may be treated as individual data objects that may standalone and/or incorporated in one or more distributed collaborative electronic documents that are accessible (via a network connection) from a file hosting or file management application/service. For lookup purposes, mappings are created correlate individual components (content portions) with one or more distributed collaborative canvases and/or documents. For instance, data associated with a component comprises but is not limited to: an identification of the component (component ID); markers indicating positioning/location of a component (e.g., start/end range of content); identification of content types and/or positioning/formatting of content (e.g., lines, rows, columns, sizing); timestamp data related to creation and management of components; and user account access relative to content, among other examples. Other data that may be stored as part of an exemplary data mapping may comprise but is not limited to: data/metadata indicating user accounts associated with a distributed collaborative canvas (including multiple components); data/metadata indicating content updates to one or more components (e.g., content portions) of a distributed collaborative canvas including timestamp data and indications of user accounts that performed respective updates; data indicating message notifications pertaining to components of a distributed collaborative canvas; data/metadata indicating mapping between components and representations of content (e.g., live representation and/or static representation); data/metadata indicating content updates to components received via representations presented inline within a host application/service endpoint; and data/metadata indicating comments, tasks, reminders, etc., associated with a component (or representation of copied content), among other examples. Any of the previously mentioned examples may be included in an individual or collective dating mapping, where a data mapping can be used to aid contextual analysis of used to generate notifications, exemplary representations of content described herein as well as contextual data associated therewith. The collaborative content component 102 may interface with other components of system diagram 100 to enable querying of data mappings which can aid processing determinations for notification generation. For instance, notification component 104 and/or a live representation management component 106 may query the collaborative content component 102 to obtain data necessary for automatic generation of a notification (comprising a live representation) or any type of representation (e.g., live representation). Furthermore, a programmed software module and/or trained AI processing may be adapted to obtain and utilize any of the above identified data pertaining to a data mapping (individually or in combination) to aid relevance processing for determining how to generate an exemplary notification and/or associated data insights. An AI model (e.g., machine learning model) may be trained to correlate data associated with a data mapping with user context data (e.g., including user activity current or past user activity and/or user preferences) to automatically generate determinations that aid contextually relevant notification generation including data insights that may be presented in association with representations of content (e.g., live representation). Additionally, exemplary knowledge repositories 112, as subsequently described, may store data needed to execute any processing operations described herein, including data mappings generated by the collaborative content component 102. Furthermore, metadata described herein can be selectively exposed to a host application/service to enable the host application/service to build features that may not be possible for statically copied text. For example, the collaborative content component 102 could pass metadata indicating who has edited a component (or content portion) to the host application/service. This could enable a hosting application/service to automatically include all the editors of the pasted content on an email or follow-up message.

An exemplary notification component 104 is one or more computer components (hardware, software or a combination thereof) configured to manage automatic generation of a notification of the present disclosure. A generated notification comprises a representation of copied content that is linked and synchronized with a distributed collaborative canvas comprising the content portion which is being updated. The present disclosure describes technical instances where representations of content (e.g., live representation or static representation) are management relative to the receipt of a copy action, a paste action or a combination thereof. In one instance, a copy paste action is a trigger for generation of a live representation of copied content.

The notification component 104 acts as a bridge component for correlating the collaborative content of a distributed collaborative canvas with operation of a user (user account) with various host applications/services such as a copy paste action. For instance, data associated with a distributed collaborative canvas, including data mappings and/or data retrieved from analysis of data mappings, may be propagated to a notification component 104 and the live representation management component 106. Additionally, the notification component 104 may receive data from the application/service endpoint component 108 pertaining to user activity (past and present) with respect to specific host applications/services and associated endpoints. This enables correlation of a state of collaborative content (e.g., one or more components of a distributed collaborative canvas) with a user context relative to operation of a host application/service, where contextual data about a copy paste action and/or content portion (e.g., component of distributed collaborative canvas) can be presented to a user (e.g., as part of a data insight notification). The present disclosure also enables provision of version history for a state of a content portion that enables a user to scrub forward and backward in time to review previous states of content.

Moreover, the notification component 104 is configured to manage its own set of data mappings that correlate collaborative content of a distributed collaborative canvas with operation of a user (user account) with various host applications/services (e.g., received from the host application/service endpoint component 108). For instance, the notification component 104 manages data mappings pertaining to a working set (or work set) that identify relationships between one or more components of a distributed collaborative canvas and an electronic file/document associated with a host application/service endpoint. Relationships, in the context of a working set, pertain to identification of technical instances where: a component of a distributed collaborative canvas are included within an electronic file/document; telemetry data pertaining to individual and/or collective instances where components are included in electronic files/documents; content ranges pertaining to inclusion of components (e.g., content portions) within an electronic document file; and evaluation of user accounts associated with components and/or electronic files/documents (e.g., cross-referencing user accounts between a distributed collaborative canvas and an electronic file/document provided through a host service endpoint).

As a non-limiting example, a data mapping for a working set may be generated relative to an individual user account or a relationship between user accounts. For instance, a user-specific working set may be generated for a specific component of a distributed collaborative canvas relative to access to files provided through host application/services. Essentially, a file-to-message mapping is generated for components of a distributed collaborative canvas, where a listing is generated identifying portions of the distributed collaborative canvas that are shared across host applications/services. As an example, a content portion of a distributed collaborative canvas may be mentioned in various chat messages of a collaborative communication application/service (e.g., MICROSOFT® TEAMS®). Say a FLUID® document "document 1" is mentioned across various chat messages and/or emails. An exemplary working set mapping can quantify this to provide contextual analysis of a state of interaction (e.g., what components of "document 1" are respectively mentioned in chat 1, chat 2, email 1, email 2). This type of data may be generated prior to an evaluation of a current user context and/or occur (or be updated) relative to an evaluation of a current user context. Furthermore, the notification component 104 may further interface with the host application/service endpoint component 108 and/or the knowledge repositories 112 to manage and store data needed to execute analysis described herein. For instance, knowledge repositories 112, as subsequently described, may store data needed to execute any processing operations described herein, including data mappings generated by the notification component 104.

Further, data mappings of working sets can be used aid management of states of representations of content. For instance, a data mapping of a working set can further comprise data correlating a state of a representation of content within host application/service endpoints. As an example, a live representation of a content portion may be rendered in a chat conversation of a collaborative communication application/service and a static representation is rendered in an email application/service. Data mappings associated with a working set can details this type of information and use it to not only generate data insight notifications for users but also synchronize content between representations (and with a distributed collaborative canvas) when a state of a representation is changed (e.g., from static representation to live representation). In one example, data mappings of a working set may be analyzed to generate a data insight identifying a forked representation of content between a distributed collaborative canvas and a static representation of content. In some instances, data insights may further be generated directing a user to improved GUI features that enable users to toggle control over a state of a representation of content, where a static representation can be automatically converted to a live representation and re-synchronized with a distributed collaborative canvas. The present disclosure also enables provision of version history for a state of a content portion that enables a user to scrub forward and backward in time to review previous states of content. Version history management may be provided through a GUI of a host application/service (e.g., GUI features/elements associated with a data insight).

The notification component 104 further manages data related to a user context derived from analysis of a collection of signal data associated with operation of a user account. Signal data may be collectively analyzed to generation determinations described herein including those where the live representation management component 106 and/or component implementing the programmed software module and/or trained AI processing 108 are executing importance/relevance scoring/ranking to automatically generate data insights. For instance, application of trained AI model (or models) may be trained to evaluate past and/or current user actions, user preferences, application/service log data, etc., that are each associated with one or more user accounts. Results of such analysis may be used to generate data insights associated with a distributed collaborative canvas and/or representations of content (e.g., live representation and/or static representation). Non-limiting examples of signal data that may be collected and analyzed comprises but is not limited to: device-specific signal data collected from operation of one or more user computing devices; user-specific signal data collected from specific tenants/user-accounts with respect to access to any of: devices, login to a distributed software platform, applications/services, etc.; application-specific data collected from usage of applications/services and associated endpoints; or a combination thereof. Analysis of exemplary signal data may further comprise identifying correlations and relationships between the different types of signal data, where telemetric analysis may be applied to generate data insights. Non-limiting examples of data insights (automatic data insight notifications) are illustrated in at least FIG. 3B and FIG. 3D.

In some instances, the notification component 104 may not have a prior creating working set mapping. As an example, a user is creating an association between a component of a distributed collaborative content and content of a host application/service endpoint for the first time (e.g., a first copy paste action). In such instances, querying of a working set data mapping may yield a determination that prior record has not been created. This may initiate processing to create a working set data mapping specific to one or more components of a distributed collaborative canvas.

Furthermore, the notification component 104 may interface with the live representation management component 106 to request generation of representation of content (e.g., a live representation). For instance, representations of content that are generated by the present disclosure comprise: a live representation, a live (non-editable) representation; and a static representation. A request for generation of a live representation may further comprise propagation of data mappings received from the collaborative content component 102 and/or created/managed by the notification component 104. The live representation management component 106 may generate determinations for creation of an exemplary notification including data to enable rendering of a (live) representation within an automatically created notification. The notification component 104 further interfaces with the application/service endpoint component 108 to transmit data for rendering of a representation of content (e.g., live representation). For instance, this may occur based on receipt of user actions such as copy actions, paste actions and/or copy paste actions. The application/service endpoint component 108 further interfaces with the notification component 104 to provide updates to content associated with the operation of an application/service. This may comprise updates to a live representation, provided in a notification, that occur inline within content of a host application/service endpoint. The notification component 104 is further configured to foster a synchronization update to one or more components of a distributed collaborative canvas that may be received through a host application/service endpoint and/or a direct update to a component of a distributed collaborative canvas.

The live representation management component 106 is one or more computer components (hardware, software or a combination thereof) configured to execute and manage processing operations related to generation and provision of determinations to aid generation of representations of content including the generation of live representations of content and/or static representations of content. In some examples, the live representation management component 106 may be a distributed computing device (e.g., distributed server device) that executes processing asynchronously from a user computing device that is usable to access a GUI of a host application/service endpoint. In other examples, the live representation management component 106 may be configured as a computing component (hardware, software or a combination thereof) that executes on the user computing device. A user computing device is an example of a computing system (401 of FIG. 4). In alternative examples, the live representation management component 106 is a system of components that execute across one or more server devices and one or more components executing on a computing system, where a network connection is usable to connect the components in a system configuration. The live representation management component 106 may be configured to execute any processing operations described herein, including those described relative to method 200 (FIG. 2) and processing associated with visual diagrams of FIGS. 3A-3H and further described in the accompanying description. It is further to be recognized that an order of execution of processing operations by the live representation management component 106 may vary without departing from the spirit of the present disclosure.

As previously referenced, live representation management component 106 interfaces with the notification component 104 to generate determinations usable to create representations of content relative to an occurrence of any of: a copy action, a paste action, and a copy paste action. This comprises generation of a (live) representation of one or more components of a distributed collaborative canvas, among other portions of a notification (pertaining to a message notification). As such, the live representation management component 106 may continuously interact with other components of system diagram 100, including the notification component 104, to provide a real-time (or near real-time) representation of content that is synchronized across any type of representation (including an original content source). As previously referenced, a state of a representation of content can be changed in real-time (or near real-time), where a representation of content (e.g., live representation of content portion(s)) needs to remain synchronized with original source content (e.g., a distributed collaborative canvas). Alternatively, different representations of a live representation can be generated such as through with editing permission control (e.g., a non-editable live representation).

The application/service endpoint component 108 is one or more computer components (hardware, software or a combination thereof) configured to manage host applications/services and associated endpoints. As previously references, the application/service endpoint component 108 interfaces with other computer components of system diagram 100 to enable management of presentation of copied and pasted content in a contextually relevant manner (e.g., inline with content of a specific host application/service endpoint). An application/service endpoint component 108 further manages presentation of a GUI usable to present an exemplary notification and foster user interaction therewith. A host application/service configured to enable execution of tasks by one or more user accounts. Non-limiting examples of host applications/services that are applicable in the present disclosure comprise but are not limited to: open-source collaborative framework applications/services; video discussion applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/services; social networking applications/services; educational learning applications/services; and suites of applications/services that may collectively comprise a combination of one or more of the previously mentioned applications/services, among other examples. The application/service endpoint component 108 further manages respective endpoints associated with individual host applications/services, which have been referenced in the foregoing description. In some examples, an exemplary host application/service may be a component of a distributed software platform providing a suite of host applications/services and associated endpoints. A distributed software platform is configured to providing access to a plurality of applications/services, thereby enabling cross-application/service usage to enhance functionality of a specific application/service at run-time. For instance, a distributed software platform enables interfacing between a host service related to management of a distributed collaborative canvas and/or individual components associated therewith and other host application/service endpoints (e.g., configured for execution of specific tasks). Distributed software platforms may further manage tenant configurations/user accounts to manage access to features, applications/services, etc. as well access to distributed data storage (including user-specific distributed data storage). Moreover, specific host application/services (including those of a distributed software platform) may be configured to interface with other non-proprietary application/services (e.g., third-party applications/services) to extend functionality including data transformation and associated implementation.

The application/service endpoint component 108 is further configured to present, through interfacing with other computer components of system diagram 100, an adapted GUI that provides user notifications, GUI menus, GUI elements, etc., to manage rendering of representations of content (e.g., live representation) and associated GUI elements including data insight notifications. For instance, a GUI of a host application/service configured for management of a distributed collaborative canvas and/or individual components associated may enable content editing (e.g., of a distributed collaborative document) and presentation of synchronized updates to the same received through any live representations rendered inline within other host application/services (and associated endpoints). This may include automatic update of components through GUI features/elements that are presented without a user having to take manual action to request. In other instances, an application command control (e.g., user interface ribbon and/or GUI menus) may be adapted to include selectable user interface features related to management of representations of content. For instance, GUI elements may be automatically generated and presented to enable users to manage a state of a representation of content. Non-limiting visual examples of an improved GUI, and GUI elements provided therein, are provided in FIGS. 3A-3H.

Moreover, a component for implementation of a programmed software module and/or trained AI processing 110 may be applied to aid generation of processing determinations of other components of system diagram 100. An exemplary component for implementation trained AI processing 108 may manage AI modeling including the creation, training, application, and updating of AI modeling. In cases where trained AI processing is applied, general application of trained AI processing including creation, training and update thereof is known to one skilled the field of art. Above what is traditionally known, trained AI processing may be adapted to execute specific determinations described herein with reference to any component of system diagram 100 and processing operations executed thereby. For instance, AI model may be specifically trained and adapted for execution of processing operations comprising but not limited to: generation of any of the previously described data mappings; generation of determinations related to identified correlations between data mappings; creations of requests/responses; automatic generation of exemplary representations of content including live representations of content that is copied and pasted; generation of exemplary GUI icon notifications including data insight notifications; prioritization of GUI icon notifications within host applications/services (and associated endpoints); generation of direct linking to contextually relevant content (presented in a host application/service) in relation to content that is copied and pasted; relevance analysis to generate any determinations described herein including generation of contextually relevant data insights; and generation of data for rendering GUI content and updates, among other examples. Exemplary AI processing may be applicable to aid any type of determinative or predictive processing by any components of system diagram 100, via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, a component for implementation of trained AI processing 108 may be configured to apply a ranker to generate relevance scoring to assist with any processing determinations with respect to any relevance analysis described herein. Non-limiting examples of relevance scoring, and specific metrics used for relevance scoring have been referenced in the foregoing description and are subsequently described including the description of method 200 (FIG. 2). Scoring for relevance (or importance) ranking may be based on individual relevance scoring metrics described herein or an aggregation of said scoring metrics. For instance, specific relevance scoring metrics can be generates pertaining to evaluation of current user activity data pertaining to management of content within host application/service endpoints (including execution of copy paste actions); past user activity data pertaining to management of content within host application/service endpoints (including execution of copy paste actions); user-specific preferences for content rendering and/or automated execution of actions (copy paste actions); and integration of functionality of an open-source collaborative framework with different host application/service endpoints (e.g., level of integration of an open-source collaborative framework with a host application/service endpoint to determine if live representations can be rendered in a host application/service endpoint), among other examples. In some instances, a relevance scoring metric for integration of an open-source collaborative framework with a host application/service endpoint is used to automatically determine whether to paste content as a live representation (e.g., execute a live paste). For instance, a host application/service endpoint may not be integrated with an open-source collaborative framework and thus not enable the presentation of a live representation of content. In such instances, evaluation of said relevance scoring metric is used to make an automatic determination to paste content as a static representation. In some alternative examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing. In some examples, business logic rules may be applied for the application of threshold and threshold evaluation used to make determinations based on relevance ranking.

As referenced in the foregoing description, knowledge repositories 112 may be accessed to manage data aiding operation of any other computer components described in system diagram 100. Knowledge resources comprise any data affiliated with a software application platform (e.g., Microsoft®, Google®, Apple®, IBM®) as well as data that is obtained through interfacing with resources over a network connection including third-party applications/services. Knowledge repositories 112 may be resources accessible in a distributed manner via network connection that may store data usable to improve processing operations described herein. Examples of data maintained by knowledge repositories 112 comprises but is not limited to: data mappings (including working set data mappings); collected signal data (e.g., from usage of an application/service, device-specific, user-specific); telemetry data including past and present usage of a specific user and/or group of users; data for execution of application/services including host application/services and associated endpoints; corpuses of annotated data used to build and train AI processing classifiers for trained AI modeling; access to entity databases and/or other network graph databases usable for evaluation of signal data; web-based resources including any data accessible via network connection including data stored via distributed data storage; trained bots including those for natural language understanding; software modules and algorithms for contextual evaluation of content and metadata; and application/service data (e.g., data of applications/services managed by the application/service component 104) for execution of specific applications/services including electronic document metadata, among other examples. In even further examples, telemetry data may be collected, aggregated and correlated (e.g., by an interfacing application/service) to further provide computer components of system diagram 100 with on demand access to telemetry data which can aid determinations generated thereby.

FIG. 2 illustrates exemplary method 200 related to creation and management of live representations of content relative to execution of copy paste actions, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100. Processing operations performed in method 200 may correspond to operations executed by a system and/or service that execute computer modules/programs, software agents, application programming interfaces (APIs), plugins, AI processing including application of trained data models, intelligent bots, neural networks, transformers and/or other types of machine-learning processing, among other examples. In one non-limiting example, processing operations described in method 200 may be executed by a computer component such as: a collaborative content component 102; a notification component 104, a live representation management component 106 (of FIG. 1), an application/service endpoint component 108 and/or a component for implementation of a programmed software module and/or trained AI processing 110. In distributed examples, processing operations described in method 200 may be implemented by one or more computer components connected over a distributed network. For example, computer components may be executed on one or more network-enabled computing devices, connected over a distributed network, that enable access to user communications.

Method 200 begins at processing operation 202, where an indication of a copy action is received. For instance, a user may execute a copy action (or live copy action). A copy action may be received through a GUI of a host application/service endpoint. A user may select one or more content portions (e.g., components of a distributed collaborative canvas) for copying and provide input indicating a request to copy content. An indication of the copy action may be received directly through a host application/service endpoint or may refer to a transmission of data from a host application/service endpoint (e.g., via an application/service endpoint component 108 of FIG. 1) to a component that is charged with managing creation of a representation of content for a copy paste action (e.g., notification component 104 and/or live representation management component 106 of FIG. 1).

As identified in the foregoing description, non-limiting examples of the present disclosure enable creation and management of live representations of content through the execution of copy actions, paste actions or a combination thereof. The term copy paste action is intended to cover technical instances where an execution of a copy action (one or more actions) is linked to the execution of a paste action (one or more actions) to complete a copy and paste of one or more content portions. A copy action may be received through any number of input modalities comprising but not limited to: GUI feature selection (e.g., application command control features and/or GUI menus providing host application/service functionality); gesture input (e.g., handwritten input, user touch-input); voice commands; and device input including keyboard (shortcut) commands, among other examples.

For instance, a host application/service, and associated GUI, is configured to recognize commands and/or present GUI elements that enable users to execute a traditional copy paste action, a live copy paste action (or individual action thereof) or even toggle therebetween. For ease of understanding, a live copy paste action is intended to refer to technical instances where a live representation of content is created that is editable and synchronized with original source content. Reference has also been made to live copy actions and live paste actions. Original source content is one or more content portions (or electronic files) at a first positional location that are copied for placement/pasting at another positional location (e.g., second positional location) which may be in the same distributed collaborative canvas or electronic document or even a different distributed collaborative canvas or electronic document.

Using a live copy paste action, users can embed content portions in other locations and/or host applications/service endpoints, to manage content in a single GUI without requiring multiple applications/services to be executing. In one example, a new keyboard command (e.g., "Control+ CC" or "Control+Shift+C") is introduced that automatically applies a live copy of one or more content portions. However, it is to be recognized that developers can program any type of keyboard (shortcut) command to correspond with a live copy (or a live paste) without departing from the spirit of the present disclosure. When a user goes to paste the copies content, any type of live representation of the content portion(s) is automatically created. In further instances, a new keyboard command (e.g., "Control+VV" or "Control+ Shift+V") is created that automatically executes a live paste action thereby pasting a live representation of content. For ease of understanding, a live paste action is intended to refer to technical instances where any type of live representation of content is created and/or presented upon pasting of content (e.g., original source content), and where a representation of a content portion is synchronized with the original source content. Live copy actions/live paste actions dovetail with traditional copy paste keyboard shortcuts, where a user can select whether to create a static representation (e.g., by using a traditional keyboard command such as "Control+C" or "Control+V") or create a live representation (e.g., using new keyboard commands "Control+CC" and "Control+VV" or other programmed keyboard shortcuts).

Whether a copy action is received through selection of GUI elements, entry of keyboard commands or another gesture (e.g., handwritten input or spoken utterance), the generating of an exemplary representation of the distributed collaborative canvas occurs based on a trigger of detecting one of those input actions triggering a copying of the content portion. In one example, the indication of a copy action is a selection of a graphical user interface (GUI) element that is configured to automatically create a live link to the distributed collaborative canvas upon execution of the copy action. For instance, one or more back-end processing components may interface to enable processing of the copy action and then notify another component (e.g., for creation of a live representation) of the received copy action. In another example, the receiving of the indication of a copy action comprises detecting a keyboard command that is configured to automatically create a live link to the distributed collaborative canvas upon a detected entry of the keyboard command, and wherein the generating of the live representation of the distributed collaborative canvas occurs based on a trigger of detecting the keyboard command that is configured to automatically create the live link to the distributed collaborative canvas. For example, a keyboard (shortcut) command may be received to execute a live copy action that automatically creates and/or copies content for generation of a live representation, which is then able to be pasted a preferred destination.

Flow of method 200 then proceeds to processing operation 204. At processing operation 204, the copy action is analyzed to aid generation of a representation (e.g., live representation) of the content portion(s) that are copied. In one example, analysis of the copy action results in generation of a live representation of the content portion(s). For example, the copy action is analyzed to determine a user account associated with the copy action and a navigation parameter that identifies a content sub-range of content that is to be copied from an electronic source (e.g., original source content). As a non-limiting example, content may comprise a component of a distributed collaborative canvas that is provided through a collaborative framework (e.g., MICROSOFT® FLUID®). In such an example, a collaborative framework applications/service is a first host application/service endpoint that manages a distributed collaborative canvas, where one or more components of the distributed collaborative canvas are copied as part of a copy action. Identification of a user account may be utilized to aid the collection and analysis of contextual signal data that is usable to generate richer versions of live representations of content portions that may comprise contextual data (e.g., rendered as data insights).

Method 200 then proceeds to processing operation 206. At processing operation 206, a representation of the content portion(s) is generated (e.g., a live representation of content one or more content portions is generated). In some alternative examples, a static representation of content (e.g., one or more content portions) is generated. The same processing operations would then apply as described herein, but the static representation would not be editable, in that state, when presented in a host application/service endpoint. As previously referenced, users could toggle between states of represented content, where a static representation is convertible to a live representation in real-time (or near real-time). As such, some examples of processing operation 206 may comprise generating both a static representation and a live representation. For ease of description, an example of a live representation may be subsequently referenced.

Whether a copy action (or paste action) is received through selection of GUI elements, entry of keyboard commands or another gesture (e.g., handwritten input or spoken utterance), the generating (processing operation 206) of the live representation of the distributed collaborative canvas occurs based on a trigger of detecting one of those input actions triggering a copying (or pasting) of the content portion. Furthermore, while some examples of the present disclosure improve efficiency by generating a live representation of a content portion upon execution of a copy action, it is also to be recognized that a representation of a content portion can be generated upon execution of a paste action (or a completion of a copy paste action). This may result in a modification of the order of operations described in method 200 but does not depart from the spirit of the present disclosure.

As previously referenced, a live representation is an editable and synchronized representation of the content portion(s) that is synchronized with a version of the content portion(s) associated with the electronic source (e.g., original source content). The live representation comprises a selectable data link that links to the original source content (e.g., the distributed collaborative canvas) and an editable representation of the content portion(s) that is associated with the sub-content range of the navigation parameter. Essentially, the live representation provides an editable version of the content portion(s) that is synchronized with original source content (e.g., the distributed collaborative canvas).

Any exemplary representation is generated based on a result of analyzing data (and metadata) previously described relative to occurrence of the copy action. For example, a navigation parameter that identifies a content sub-range of content that is to be copied from an electronic source (e.g., original source content) is used to identify the content to render in an exemplary representation. User account data associated with a copy action (e.g., live copy action, live copy paste action) may be used to identify relevant signal data used to generate contextual data, which is able to be rendered in a (live) representation. For instance, data insights may be generated such as an indication of a user account that executed the copy paste action. Trained AI processing may be executed to create contextual data and/or data insights pertaining to content including content presented in a (live) representation and about the copy paste action. Non-limiting examples of data that is included in a data insight comprises but is not limited to: contextual data identifying a history of the copy paste action that comprises: data identifying the user account that executed the copy paste action a timestamp associated with the copy paste action; and contextual data identifying a creation and/or edit history of the content portion (e.g., of the distributed collaborative canvas), among other examples. In deriving contextual data (and generating associated data insights thereof), processing operation 206 comprises analysis of signal data previously described which may include analysis of application-specific/service-specific data pertaining to a current copy and/or paste action (or copy paste action), previous user activity data (one or more users) and telemetry data gathered from analysis of previous user activity data (e.g., derivation of user preferences for content provision as well as automated determinations with respect to copy paste actions). In some examples, relevance scoring metrics are generated to aid processing determinations for the inclusion of specific types of contextual data with a (live) representation. In further instances, application/service endpoint component (108 of FIG. 1) can use contextual data (and associated metadata) to building out additionally functionality through specific host application/service endpoints.

Moreover, generation (processing operation 206) of a (live) representation further comprises the inclusion of one or more GUI features/elements that foster management over the (live) representation and presentation within an exemplary host application/service endpoint. As an example, one or more GUI features/elements are created as part of the live representation (or a notification thereof) that enable users to toggle control over expanding/collapsing the live representation. For instance, a GUI feature/element is presented that automatically creates a collapsed view of the (live) representation removing, from display, the content of the (live) representation thereby displaying only the selectable data link associated with original source content (e.g., the distributed collaborative canvas). This enables users to visually recognize that content from one host application/service (e.g., associated with a collaborative framework) is embedded within another host application/service endpoint while still providing a quick way to link back to the original source content. In another example, a GUI feature/element is presented that automatically creates an expanded view of the (live) representation. In one instance, this type of GUI feature maybe presentable when a (live) representation is in a collapsed view. However, in other examples, this type of GUI feature enables a (live) representation to be expanded to see additional data such as contextual data (e.g., represented as automatically generated data insights).

In further instances, GUI features/elements are created that enable users to manage sharing permissions pertaining to a (live) representation. For instance, GUI features may be presented through an adapted GUI of a host application/service that enable users to control sharing permissions related to sharing and editing activity associated with a (live) representation. As an example, a user may wish to have a live representation editable through one host application/service but static representations of content in other locations so that other untrusted users are unable to edit the content.

Additionally, processing operation 206 further comprises creating GUI features/elements that enable users to toggle between a static representation of content and a live representation of content. For example, a user may wish to make some draft changes to the static representation before synchronizing those changes with the distributed collaborative canvas. In other instances, a user may intentionally wish to create a forked representation of the content from that which is presented in the distributed collaborative canvas. If the user wishes to switch back to a live representation at any point in time, a GUI sub-menu is rendered and used to achieve this desire. Once a live representation is re-activated, the live representation may be automatically synchronized with the original source content. As such, optimal control options are presented to a user for managing a live representation and its interactions with other versions of representations of content including the original source content.

Furthermore, the present disclosure further helps users keep track of different versions of content (e.g., the original source content relative to representations presented though various host applications/service endpoints) by enabling creation of a notification association. Processing operation 206 further comprises creation of a notification association. The notification association is configured to automatically create a rule that transmits a notification to a creator of the original source content (and/or other permitted users) when a copy paste action occurs for that content and/or a representation of the original source content is updated. This helps keep the creator of the content in the loop as to when/how content (e.g., components of a distributed collaborative canvas) is updated, especially in collaborative scenarios. In one example, a first user account executes a copy paste action on a content portion of a distributed collaborative canvas. A second user account is identified as the creator of the content portion of the distributed collaborative canvas, and that second user account is automatically notified of a completion of the copy paste action by the first user account. The modality and type of notification can be set by users when creating a notification association or alternatively is automatically set by developers. For instance, an email notification or a message notification is sent to the creator of the content portion. As such, a notification association can be created when a copy paste action is initiated.

The present disclosure is also configured to automatically create a non-exhaustive list of locations where the content was copy/pasted. For example, if the content is pasted from a distributed collaborative canvas (or electronic document), into several different chat conversations, the creator of the content, in some instances, could be displayed a list of which chats included different versions (e.g., live representations, static representations, etc.) of the content. The present disclosure is further configured to enable the original creator of the content could have the ability to revoke access to the live pasted content or could revoke access to the content based on where the content was pasted (e.g., if the content was pasted in error into a chat conversation with participants from outside of a company).

Furthermore, in alternative examples, data that is copied is synchronized with an OS keyboard that allows an application/service, which receives the paste action, to render a live representation or a static representation. This is novel in that a live representation that is placed on the user's clipboard can be encoded in a way that host applications/services, not updated to render live content, can gracefully fall back to the traditional behavior of copying and pasting forked content.

Flow of method 200 then proceeds to processing operation 208. At processing operation 208, an indication of a paste action (e.g., live paste action) is received. A receipt of an indication of a paste action is thereby used to complete a copy paste action. A paste action may be received through a GUI of a host application/service endpoint. For instance, a user may select a location in an electronic document (same as that from which content was copied or a different electronic document), distributed collaborative canvas, etc., for pasting of copied content (e.g., original source content). A user may then execute an action to paste that content at the selected location. An indication of the paste action may be received directly through a host application/service endpoint or may refer to a transmission of data from a host application/service endpoint (e.g., via an application/service endpoint component 108 of FIG. 1) to a component that is charged with managing creation of a representation of content for a copy paste action (e.g., notification component 104 and/or live representation management component 106 of FIG. 1). A paste action may be received through any number of input modalities comprising but not limited to: GUI feature selection (e.g., application command control features and/or GUI menus providing host application/service functionality); gesture input (e.g., handwritten input, user touch-input); voice commands; and device input including keyboard (shortcut) commands, among other examples. For example, a keyboard (shortcut) command may be received to execute a live paste action that automatically creates and/or pastes a live representation of content at a selected location.

At processing operation 210, data for rendering of the (live) representation is transmitted to a host application/service endpoint. For instance, the host application/service endpoint is that which a user selects as a destination for completing a copy paste action. As an example, a component that generates a representation of content (e.g., live representation and/or static representation) transmits data for the rendering a live representation to an application/service endpoint component (108 of FIG. 1). This enables the live representation to be rendered in a GUI of a host application/service endpoint.

Flow of method 200 then proceeds to processing operation 212. At processing operation 212, a representation (e.g., live representation) of the content portions(s) is automatically rendered inline within a graphical user interface (GUI) of a host application/service endpoint. For instance, a live representation of a content portion is rendered at a preferred destination within a GUI of a host application/service endpoint. While a collaborative framework application/service may be considered as a first host application/service endpoint, the paste action occurs in a second host application/service endpoint that is different from the first application/service endpoint. For instance, the content portion is pasted in an endpoint of a word processing application/service, spreadsheet application/service, collaborative communication application/service, etc.

In some examples, flow of method 200 then proceeds to processing operation 214. At processing operation 214, a creator of content (e.g., one or more content portions or components of a distributed collaborative canvas) is automatically notified of a completion of a copy paste action. As previously referenced, processing operation 214 automatically occurs in technical instances where a notification association is created for a content representation (e.g., live representation). A first user account may be a user that executed the copy paste action. A second user account is considered as a creator of the content portion of the distributed collaborative canvas, where the second user account is identified to initiation an automated notification. The second user account is notified of a completion of the copy paste action by the (first) user account. The modality and type of notification can be set by users when creating a notification association or alternatively is automatically set by developers. For instance, an email notification or a message notification is sent to the creator of the content portion.

In some examples, flow of method 200 then proceeds to processing operation 216. At processing operation 216, presentation of a representation of content is updated based on received user actions with said representation. For instance, a user may interact with a GUI feature/element presented in a live representation. Non-limiting examples of GUI features/elements have been previously described. Furthermore, visual examples of such GUI features/elements are provided (and further described) in the description of FIGS. 3A-3H.

As an example, processing operation 216 comprises updating presentation of a live representation if a user selects a GUI feature/element to toggle between a static representation of content and a live representation of content. In another example, processing operation 216 comprises updating presentation of a live representation if a user selects a GUI feature/element to toggle control over expanding/collapsing the live representation. In response to receiving the selection of that specific GUI feature/element, processing automatically collapses (or expands) the (live) representation. In further instances, user actions (e.g., hover actions) may trigger the automatic display of data insights related to a representation (e.g., live representation and/or static representation).

Flow of method 200 then proceeds to decision operation 218. At decision operation 218, it is determined whether user action is received to modify the content presented in a (live) representation. As previously referenced, any updates to the content of (live) representation or the original source content automatically triggers an update to displayed content at either location. In examples where no user action is received to modify content of a live representation, flow of decision operation 218 branches "NO" and processing of method 200 remains idle until additional user action is received interacting with an exemplary representation and/or original source content.

In examples where content of a (live) representation is modified, flow of decision operation 218 branches "YES" and processing of method 200 proceeds to processing operation 220. At processing operation 220, a content update to a (live) representation triggers automatic update of the original source content (e.g., the distributed collaborative canvas). This helps keep content versions synchronized across the various distributed locations.

FIGS. 3A-3H illustrate exemplary processing device views providing user interface examples of an improved user interface that is adapted for intelligent management of copy paste actions, with which aspects of the present disclosure may be practiced. FIGS. 3A-3F provide non-limiting front-end examples of processing described in the foregoing including system diagram 100 and method 200 (FIG. 2).

FIG. 3A presents processing device view 300, illustrating a GUI 302 of a host application/service configured for management of a distributed collaborative canvas. As referenced in the foregoing description, an exemplary host application/service (for management of a distributed collaborative canvas) may be a host service associated with an open-source collaborative framework (e.g., a collaborative framework application/service). Users can create, access, manage etc., content relative to a distributed collaborative canvas through a GUI (302) similar to that shown in processing device view 300. GUI 302 provides a representation of a distributed collaborative canvas that presents a distributed electronic document ("Document 1.fluid") created in a document format associated with the open-source collaborative framework (e.g., ".fluid").

In the example shown in processing device view 300, the distributed electronic document comprises a plurality of components, which are shown as components/content portions (e.g., "Agenda", "Notes" "Tasks"). For ease of understanding, only one component 304 ("Tasks") is numbered in processing device view 300. It is to be recognized that similar processing operations described with reference to component 304 are applicable to components of any data type or format. The components collectively represent content of the distributed electronic document (e.g., a representation of a distributed collaborative canvas) but are also treated as individual data objects. As previously referenced, live representations of the present disclosure can be reflective of one or more individual components, while keeping an association to the distributed collaborative canvas and/or a distributed electronic document as an original source of a respective component.

Processing device view 300 further illustrates the initiation of a copy paste action pertaining to the component 304 ("Tasks"), where a user provides input copying the component 308 from an associated endpoint of the collaborative framework application/service. For instance, at a location 306 over the component 304, a user executes a user action 308 to copy the component 304. As a non-limiting example, a GUI menu 310 is automatically presented for the user to confirm whether to copy the component 304. In alternative examples (not shown) a user may provide other types of inputs to enter a copy action and/or past action including but not limited to keyboard (shortcut) commands described herein, gesture input and/or spoken utterance.

FIG. 3B presents processing device view 320, illustrating a continued example of processing from that shown in processing device view 300 (FIG. 3A). Processing device view 320 illustrates a result of back-end contextual analysis described herein, where a user action 322 within the GUI 302 triggers automatic presentation of a data insight 324. For instance, a user executes user action 322 that hovers over the GUI menu 310 (of FIG. 3A), which results in the automatic presentation of data insight 324. Data insight 324 provides a user with information identifying an exemplary live copy feature (or live copy paste feature) that a user can use to create a live copy of component 304 (FIG. 3A). Data insight 324 highlights a keyboard (shortcut) command (e.g., "CTRL+CC") that automatically creates a live copy (execution of a live copy action) of the content portion. Similar data insights can be provided to highlight other novel functionality of an improved GUI, including keyboard (shortcut) commands for execution of a live paste (e.g., "CTRL+VV"). Data insight 324 helps users identify new points of novelty which the user can subsequently use to improve processing efficiency during subsequent copy paste actions.

FIG. 3C presents processing device view 330, illustrating a continued example of processing from that shown in processing device view 300 (FIG. 3A). Processing device view 330 illustrates an example where a user completes a copy paste action by pasting content into a GUI of another host application/service endpoint being an endpoint of a collaborative communication service. For instance, a user executes user action 332 (e.g., one or more device input actions) that triggers presentation of a GUI menu to complete a paste action. As a result of back-end processing described herein, the GUI menu displayed in processing device view 330 enables the user to manually select whether to apply a static paste action or a live paste action. A static paste action would result in the pasting of a static representation of the content portion (component 304 of FIG. 3A) previously copied. A live paste action would result in the pasting of a live representation of the same content portion. In the example shown in processing device view 330, the user executes a second user action 334 selecting to paste the content portion as a live representation (e.g., via a live paste action). Alternatively, the user can create the same effect through alternative input means (e.g., keyboard command, spoken utterance that references "live paste" or "live representation").

The processing result from execution of the second user action 334 is the presentation of a live representation 336 of the content portion (component 304 of FIG. 3A). As can be seen in processing device view 330, the live representation 336 of the distributed collaborative canvas is provided inline with content of a chat conversation within the GUI of the collaborative communication service. Continuing that example, live representation 336 comprises a representation of component 304 ("Tasks") as presented within the distributed collaborative canvas (original source content). The representation is editable and is synchronized with the original content source (distributed collaborative canvas) displaying only content that was copied from the distributed collaborative canvas. Furthermore, the live representation 336 comprises contextual data identifying data associated with the copy paste action. For instance, contextual data identifies that the paste occurred relatively recently (e.g., " . . . 3 minutes ago"). Moreover, the live representation 336 comprises a link 340 to the original source content (e.g., the distributed collaborative canvas "Document1.fluid"). Selection of link 340 automatically directs the user back to the distributed collaborative canvas, for example, to the point dictated by the navigation parameter.

FIG. 3D presents processing device view 350, illustrating a continued example of processing from that shown in processing device view 330 (FIG. 3C). As illustrated in processing device view 350, a user executes user action 352 that hovers over the live representation 336 which automatically triggers presentation of data insight 354. Data insight 354 is an automatic data insight notification that provides contextual data pertaining to execution of the copy paste action as well as addition of component 304 ("Tasks") to the distributed collaborative canvas. This helps users understand context surrounding not only the copy paste action but also incorporation of the component 304 into the distributed collaborative canvas.

FIG. 3E presents processing device view 360, illustrating a continued example of processing from that shown in processing device view 330 (FIG. 3C). Processing device view 360 emphasizes features of an adapted GUI configured to enable users to toggle control over the form in which a live representation 336 is presented. For instance, the live representation 336 may comprise GUI elements that, when selected, enable a user to expand or collapse the live representation 336. For instance, user action 362 selects a GUI element configured to provide a collapsed rendering of live representation 336. In response to receipt of user action 362, a collapsed rendering is presented as shown in processing device view 360. The collapsed rendering display on the link 340 (of FIG. 3C) to the distributed collaborative canvas, where the other content of the live representation 336, previously displayed, is removed from presentation. Should a user wish to view the entirety of the live representation, a GUI element configured to expand viewing of the live representation 336 is also provided. It is further noted that control over a display of a state of a representation of content could be managed using non-GUI input. For example, a trained AI model is configured to determine, based on the type of content selected, a form for rendering a representation of content (e.g., collapsed or expanded) as well as the location where the content will be pasted, or other factors to automatically pre-select an option for the user.

Figure 3F:
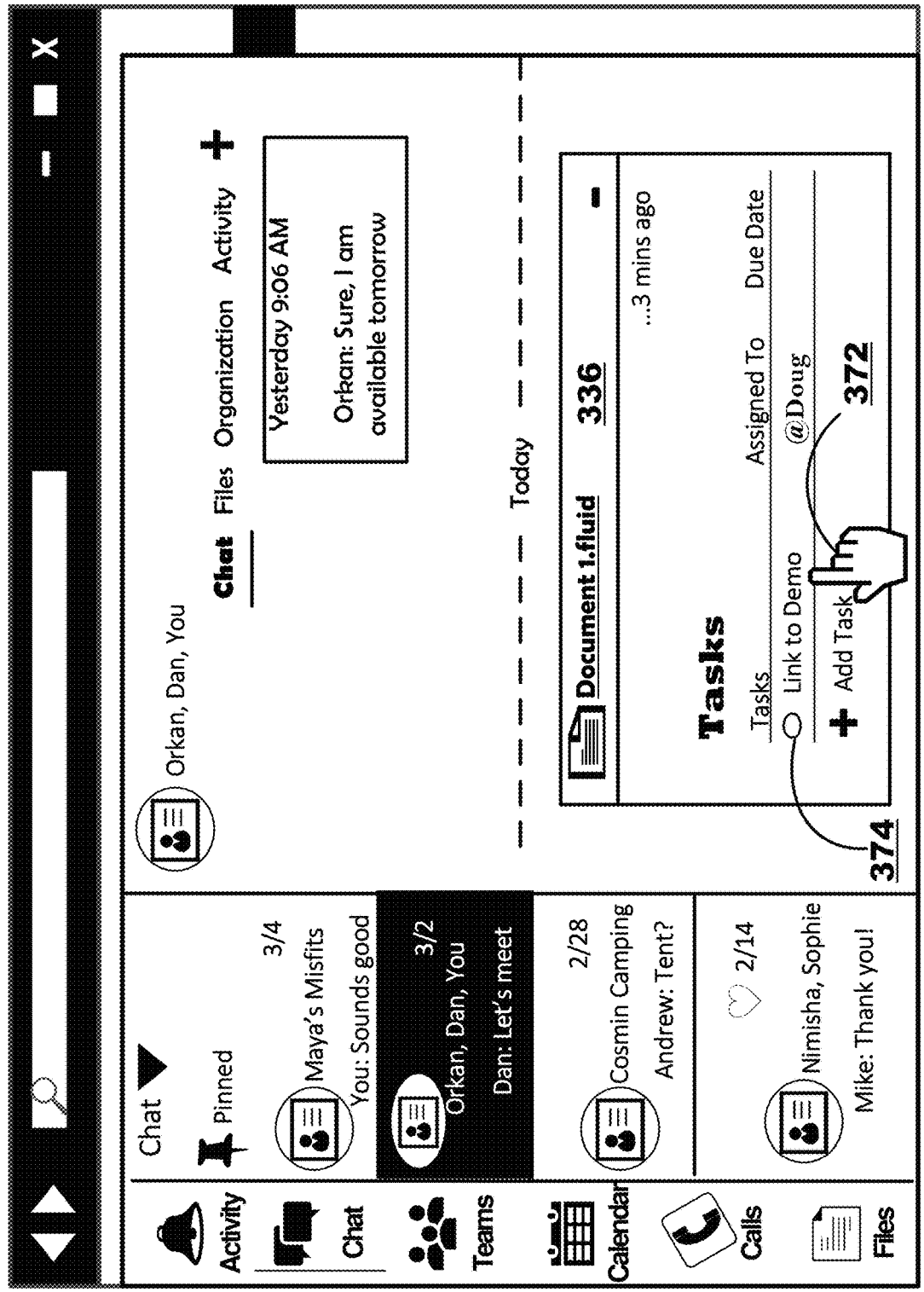

FIG. 3F presents processing device view 370, illustrating an example where a user edits content of the live representation 336. In the example shown in processing device view 370, a user action 372 is executed that modifies a content sub-field of the component 304 via the live representation 336. For instance, a user changes a task sub-field 374 from "Add Data Link" to "Link to Demo". As previously referenced, any updates to the content of an exemplary live representation (or the original source content) automatically triggers an update to displayed content at either location. Processing device view 380 (FIG. 3G) illustrates a result of that user action 372, where a representation of the distributed collaborative canvas is automatically updated to maintain synchronization with the live representation 336.

FIG. 3G presents processing device view 360, illustrating a continued example of processing from that shown in processing device view 370 (FIG. 3F). As identified above, processing device view 380 (FIG. 3G) illustrates a result of that user action 372 (FIG. 3f), where a component 304 of the distributed collaborative canvas is automatically updated to maintain synchronization with the live representation 336. For instance, a task sub-field 382 is automatically modified to read "Link to Demo" in response to user action 372 (FIG. 3F).

Figure 3H:
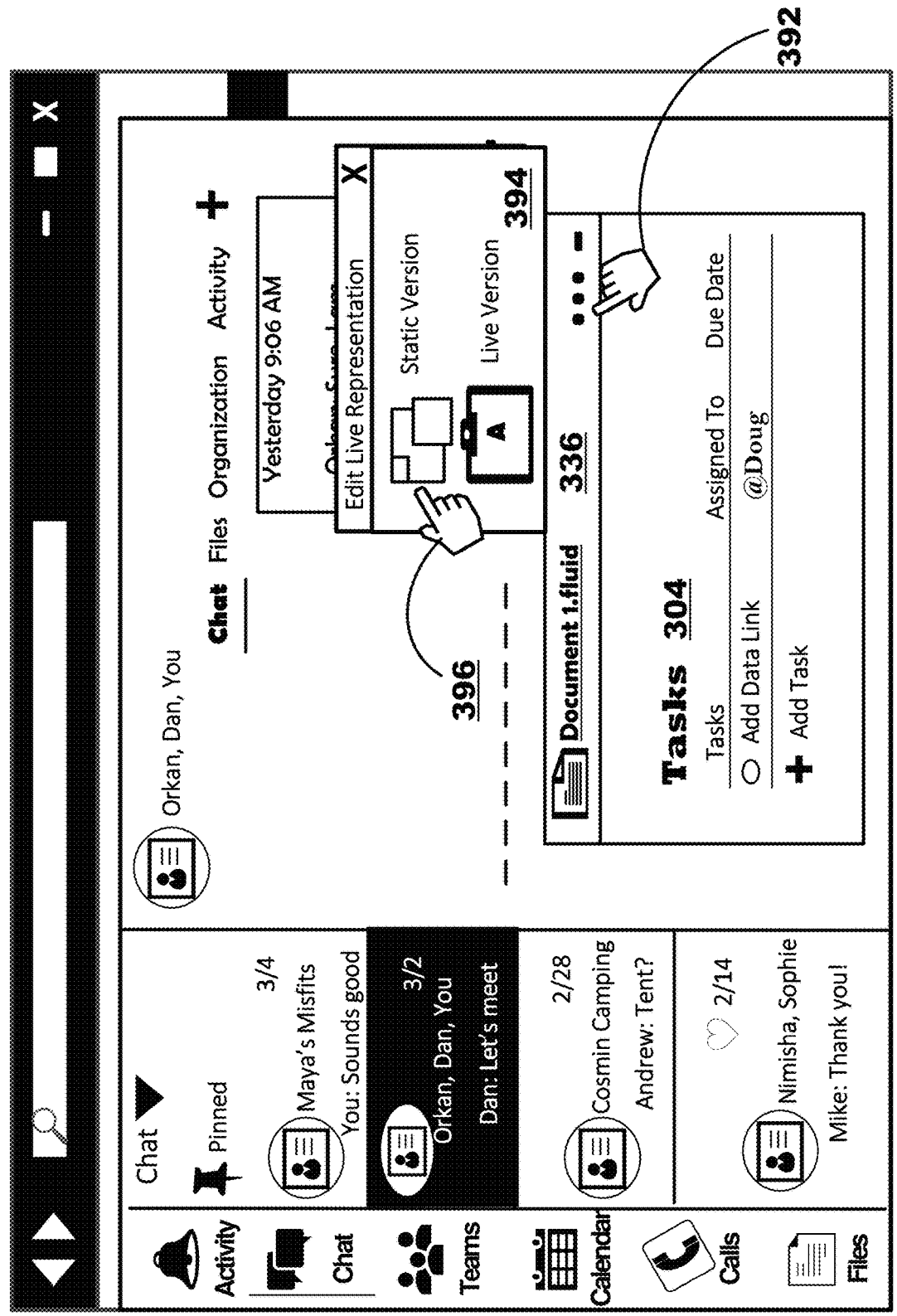

FIG. 3H presents processing device view 390, illustrating an adapted GUI that provides the user with control over toggling between a live representation of a content portion and a static representation of a content portion. For instance, a user action 392 is received that selects, within a rendering of the live representation 336, a GUI feature configured to provide additional data management options for the live representation 336. In response to receipt of the user action 392, a GUI sub-menu 394 is provided that provides a user with control over toggling between a live representation of a content portion and a static representation of a content portion. As content is provided as a live representation 336, the user can utilize GUI sub-menu 394 to switch to a static representation of a content portion. For instance, user action 396 is received that selects a GUI feature configured to automatically convert the live representation 336 to a static representation. At that point in time, the static representation becomes unsynchronized with the distributed collaborative canvas. For instance, a user may wish to make some draft changes to the static representation before synchronizing those changes with the distributed collaborative canvas. In other instances, a user may intentionally wish to create a forked representation of the content from that which is presented in the distributed collaborative canvas. If the user wishes to switch back to a live representation 336 at any point in time, the GUI sub-menu 394 can be re-accessed and used to achieve this desire. Once a live representation 336 is re-activated, the live representation 336 may be automatically synchronized with the component 304 of the distributed collaborative canvas.

Figure 4:
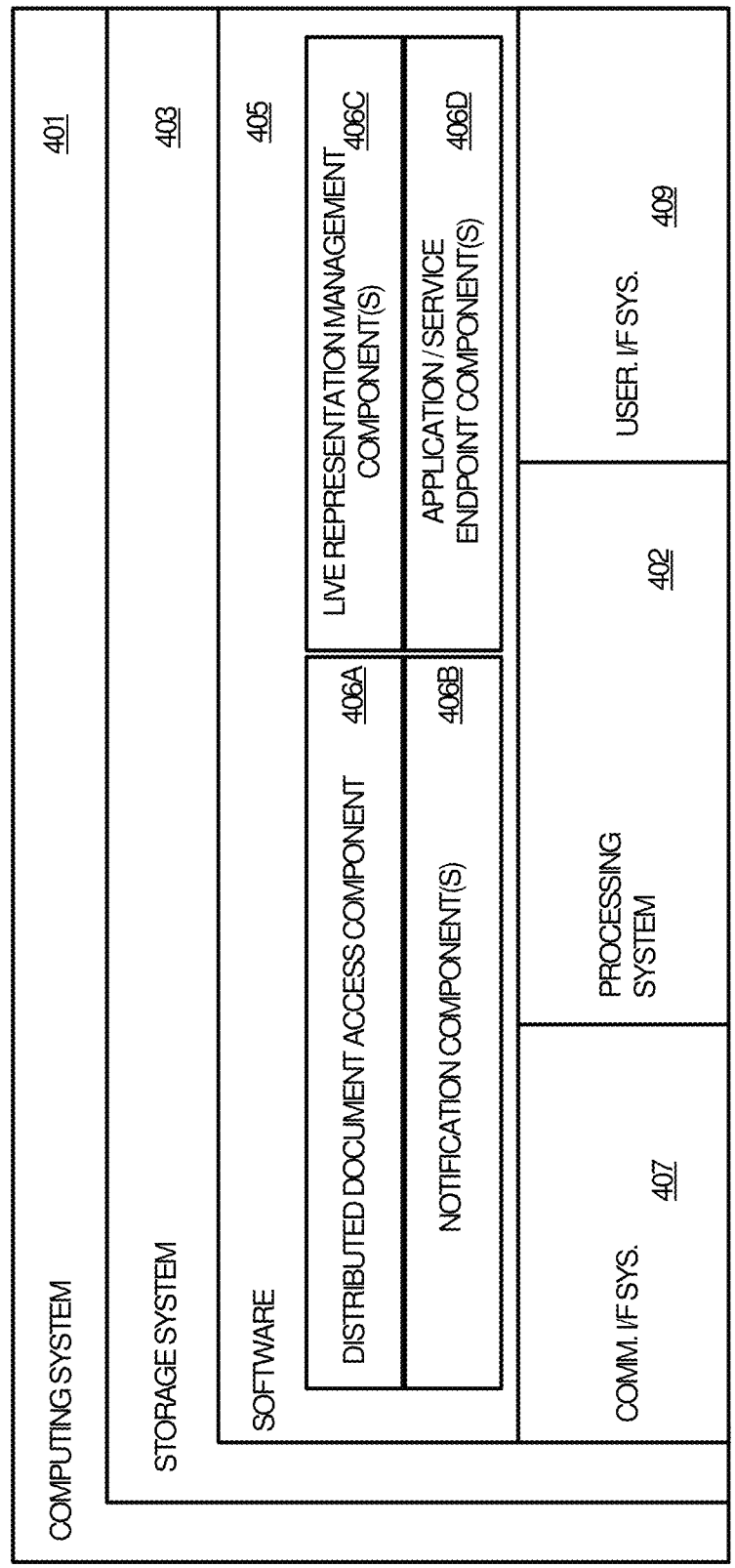
FIG. 4 illustrates a computing system suitable for implementing processing operations described herein related to intelligent management of copy paste actions, with which aspects of the present disclosure may be practiced.

FIG. 4 illustrates a computing system 401 suitable for implementing processing operations described herein related to intelligent management of copy paste actions, with which aspects of the present disclosure may be practiced. As referenced above, computing system 401 may be configured to implement processing operations of any component described herein including exemplary components previously described in system diagram 100 (FIG. 1). As such, computing system 401 may be configured to execute specific processing operations to solve the technical problems identified in the foregoing related to management of copy paste actions as well as introduce novel processing operations and an improved GUI pertaining to the same. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406A-D) that are configured to enable functionality described herein. In some examples, computing system 401 may be connected to other computing devices (e.g., display device, audio devices, servers, mobile/remote devices, gaming devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), processing operations described in method 200 (FIG. 2) and/or the accompanying description of FIGS. 3A-3H.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing a collaborative content component 406a; a notification component 406b; a live representation management component 406c; and an application/service endpoint component 406d, as described herein. In further examples, software may comprise program instructions for executing a separate component for implementation of a programmed software module and/or trained AI processing though in other instances a programmed software module and/or trained AI processing may be executed by one of the other components of system diagram 100 in combination with one or more computing systems 401.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: an improved GUI providing automatic generation of live representations and GUI features/elements to manage the same; synchronization of updates to a distributed collaborative canvas and associated live representations of content associated therewith; generation and management of contextual data insights related to management of content portions and copy paste actions; providing follow-up notifications (e.g., to creators of a content portion and/or messages); and providing notifications through different host application/service endpoints (e.g., via GUI elements, OS notifications and/or inline with content), among other examples. User interface system 409 comprises a graphical user interface that presents graphical user interface elements representative of any point in the processing described in the foregoing description including processing operations described in system diagram 100 (FIG. 1), method 200 (FIG. 2), and front-end representations related to the description of FIGS. 3A-3H. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Some non-limiting examples of the present disclosure describe systems and/or method for managing copy paste actions including generation and presentation of live representations of one or more content portions. For instance, a computer-implemented method may be executed across at least one computing device, including a system, to accomplish processing described herein. Alternatively, a computer-readable storage media is programmed to execute computer-executable instructions pertaining to a method for managing copy paste actions.

An indication of a copy action, as part of a copy paste action, is received that copies one or more content portions. In one example, the indication of a copy action is a selection of a graphical user interface (GUI) element that is configured to automatically create a live link to the distributed collaborative canvas upon execution of the copy action. For instance, one or more back-end processing components may interface to enable processing of the copy action and then notify another component (e.g., for creation of a live representation) of the received copy action. In another example, the receiving of the indication of a copy action comprises detecting a keyboard command that is configured to automatically create a live link to the distributed collaborative canvas upon a detected entry of the keyboard command, and wherein the generating of the live representation of the distributed collaborative canvas occurs based on a trigger of detecting the keyboard command that is configured to automatically create the live link to the distributed collaborative canvas.

The copy action is analyzed to generate a live representation of the content portion(s). For example, the copy action is analyzed to determine a user account associated with the copy action and a navigation parameter that identifies a content sub-range of content that is to be copied from an electronic source (e.g., original source content). As a non-limiting example, content may comprise a component of a distributed collaborative canvas that is provided through a collaborative framework (e.g., MICROSOFT® FLUID®). In such an example, a collaborative framework applications/service is a first host application/service endpoint that manages a distributed collaborative canvas, where one or more components of the distributed collaborative canvas are copied as part of a copy action.

In one example, analysis of the copy action results in generation of a live representation of the content portion(s). Whether a copy action is received through selection of GUI elements, entry of keyboard commands or another gesture (e.g., handwritten input or spoken utterance), the generating of the live representation of the distributed collaborative canvas occurs based on a trigger of detecting one of those input actions triggering a copying of the content portion. Furthermore, while some examples of the present disclosure improve efficiency by generating a live representation of a content portion upon execution of a copy action, it is also to be recognized that a live representation of a content portion can be generated upon execution of a paste action (or a completion of a copy paste action). A live representation is an editable and synchronized representation of the content portion(s) that is synchronized with a version of the content portion(s) associated with the electronic source (e.g., original source content). The live representation comprises a selectable data link that links to the original source content (e.g., the distributed collaborative canvas) and an editable representation of the content portion(s) that is associated with the sub-content range of the navigation parameter. Essentially, the live representation provides an editable version of the content portion(s) that is synchronized with original source content (e.g., the distributed collaborative canvas).

In response to receiving an indication of a paste action, thereby completing a copy paste action, the live representation of the content portion(s) is automatically rendered inline within a graphical user interface (GUI) of a host application/service endpoint. While a collaborative framework application/service may be considered as a first host application/service endpoint, the paste action occurs in a second host application/service endpoint that is different from the first application/service endpoint. For instance, the content portion is pasted in an endpoint of a word processing application/service, spreadsheet application/service, collaborative communication application/service, etc.

Any updates to the content of live representation or the original source content automatically triggers an update to displayed content at either location. For instance, an indication of an update to content of the live representation is received. In response to receiving the indication of the update to the content of the live representation, an update is automatically applied to the content to original source content (e.g., the distributed collaborative canvas).

In further technical examples, a notification association is implemented to notify a creator of the content portion (of the distributed collaborative canvas) that the content portion has been copied and pasted. For instance, a second user account that is a creator of the content portion of the distributed collaborative canvas is identified, with a first user account being the user that executed the copy paste action. The second user account is notified of a completion of the copy paste action by the (first) user account. The modality and type of notification can be set by users when creating a notification association or alternatively is automatically set by developers. For instance, an email notification or a message notification is sent to the creator of the content portion.

Moreover, a live representation may comprise contextual data that keeps users up to date regarding a state of the live representation and/or the original source content. Contextual data is presentable within the live representation and/or as automatic data insights that are presented through a GUI of a host application/service endpoint in association with a live representation. Trained artificial intelligence (AI) processing may be executed to create contextual data and/or data insights pertaining to content including content presented in a live representation and about the copy paste action. As an example, an indication of a hover action is received, where a GUI element providing data insight(s) is automatically rendered for a user. Non-limiting examples of data that is included in a data insight comprises but is not limited to: contextual data identifying a history of the copy paste action that comprises: data identifying the user account that executed the copy paste action a timestamp associated with the copy paste action; and contextual data identifying a creation and/or edit history of the content portion (e.g., of the distributed collaborative canvas), among other examples.

The present disclosure further enables users to toggle between a static representation of content and a live representation of content. For instance, a host application/service, and associated GUI, is configured to recognize commands and/or present GUI elements that enable users to execute a traditional copy paste action, a live copy paste action or toggle therebetween. For ease of understanding, a live copy paste action is intended to refer to technical instances where a live representation of content is created that is editable and synchronized with original source content. Using a live copy paste action, users can embed content portions in other locations and/or host applications/service endpoints, to manage content in a single GUI without requiring multiple applications/services to be executing. Alternatively, users may wish to toggle between a live representation of the content portion and a static representation of the content portion. For instance, a GUI element selection may be received, that is associated with a live representation, that is configured to automatically convert the live representation to a static representation of the distributed collaborative canvas that displays only a current state of the content portion. The present disclosure also enables provision of version history for a state of a content portion that enables a user to scrub forward and backward in time to review previous states of content. In response to receiving the GUI selection, processing occurs to automatically converting the live representation to the static representation.

Additionally, the present disclosure enables users to toggle control over the form in which a live representation is presented. For instance, a live representation comprises a GUI element that is configured to enable toggle control over expanding/collapsing the live representation. A selection of that GUI element is received. In response to receiving the selection of the GUI element, processing automatically collapses the live representation to remove, from display, the content of the live representation thereby displaying only the selectable data link associated with the distributed collaborative canvas.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
receiving an indication of a copy action, as part of a copy paste action, that copies a content portion from a distributed collaborative canvas presented in a first host service;
in response to receiving the indication of the copy action, analyzing the copy action to determine a user account associated with the copy action and a navigation parameter identifying a content sub-range of the distributed collaborative canvas relative to an occurrence of the copy action;
generating, based on an analysis of the copy action, a live representation of the distributed collaborative canvas that comprises:
a selectable data link that links to the distributed collaborative canvas as original source content, and
an editable version of the content portion, associated with the sub-content range of the navigation parameter, that is synchronized with the distributed collaborative canvas;
receiving an indication of a paste action, as part of the copy paste action, that requests to paste the content portion, into a second host service, inline with content of the second host service; and
in response to receiving the indication of the paste action, completing the copy paste action by automatically rendering the live representation of the distributed collaborative canvas inline within the second host service.

2. The computer-implemented method of claim 1, wherein the indication of a copy action is a selection of a graphical user interface (GUI) element that is configured to automatically create a live link to the distributed collaborative canvas upon execution of the copy action, and wherein the generating of the live representation of the distributed collaborative canvas occurs based on a trigger of detecting the selection of the GUI that is configured to automatically create the live link to the distributed collaborative canvas.

3. The computer-implemented method of claim 1, wherein the receiving of the indication of a copy action comprises detecting a keyboard command that is configured to automatically create a live link to the distributed collaborative canvas upon a detected entry of the keyboard command, and wherein the generating of the live representation of the distributed collaborative canvas occurs based on a trigger of detecting the keyboard command that is configured to automatically create the live link to the distributed collaborative canvas.

4. The computer-implemented method of claim 1, further comprising: receiving, from the second host service, an indication of an update to content of the live representation by the user account; and in response to receiving the indication of the update to the content of the live representation, automatically applying the update to the content to the distributed collaborative canvas.

5. The computer-implemented method of claim 1, further comprising: identifying a second user account as a creator of the content portion of the distributed collaborative canvas; and notifying the second user account, as the creator of the content portion, of a completion of the copy paste action by the user account.

6. The computer-implemented method of claim 1, further comprising: receiving a hover action over the live representation; and in response to the receiving of the hover action, automatically presenting a graphical user interface (GUI) element providing a data insight providing contextual data identifying a history of the copy paste action comprising: data identifying the user account that executed the copy paste action, a timestamp associated with the copy paste action, and contextual data identifying an edit history of the content portion of the distributed collaborative canvas.

7. The computer-implemented method of claim 1, further comprising: receiving a graphical user interface (GUI) element selection, associated with the live representation, that is configured to automatically convert the live representation to a static representation of the distributed collaborative canvas that displays only a current state of the content portion; and in response to receiving the GUI selection, automatically converting the live representation to the static representation.

8. The computer-implemented method of claim 1, wherein the live representation further comprises a graphical user interface (GUI) element that is configured to enable toggle control over expanding/collapsing the live representation, and wherein the computer-implemented method further comprising: receiving a selection of the GUI element; and in response to receiving the selection of the GUI element, collapsing the live representation to remove, from display, the content of the live representation thereby displaying only the selectable data link associated with the distributed collaborative canvas.

9. A system comprising:
at least one processor; and
a memory, operatively connected with the at least one processor, storing computer-executable instructions that, when executed by the at least one processor, causes the at least one processor to execute a method that comprises:
receiving an indication of a copy action, as part of a copy paste action, that copies a content portion from a distributed collaborative canvas presented in a first host service;
in response to receiving the indication of the copy action, analyzing the copy action to determine a user account associated with the copy action and a navigation parameter identifying a content sub-range of the distributed collaborative canvas relative to an occurrence of the copy action;
generating, based on an analysis of the copy action, a live representation of the distributed collaborative canvas that comprises:
a selectable data link that links to the distributed collaborative canvas as original source content, and
an editable version of the content portion, associated with the sub-content range of the navigation parameter, that is synchronized with the distributed collaborative canvas;
receiving an indication of a paste action, as part of the copy paste action, that requests to paste the content portion, into a second host service, inline with content of the second host service; and
in response to receiving the indication of the paste action, completing the copy paste action by automatically rendering the live representation of the distributed collaborative canvas inline within the second host service.

10. The system of claim 9, wherein the indication of a copy action is a selection of a graphical user interface (GUI) element that is configured to automatically create a live link to the distributed collaborative canvas upon execution of the copy action, and wherein the generating of the live representation of the distributed collaborative canvas occurs based on a trigger of detecting the selection of the GUI that is configured to automatically create the live link to the distributed collaborative canvas.

11. The system of claim 9, wherein the receiving of the indication of a copy action comprises detecting a keyboard command that is configured to automatically create a live link to the distributed collaborative canvas upon a detected entry of the keyboard command, and wherein the generating of the live representation of the distributed collaborative canvas occurs based on a trigger of detecting the keyboard command that is configured to automatically create the live link to the distributed collaborative canvas.

12. The system of claim 9, wherein the method, executed by the at least one processor, further comprises: receiving, from the second host service, an indication of an update to content of the live representation by the user account; and in response to receiving the indication of the update to the content of the live representation, automatically applying the update to the content to the distributed collaborative canvas.

13. The system of claim 9, wherein the method, executed by the at least one processor, further comprises: identifying a second user account as a creator of the content portion of the distributed collaborative canvas; and notifying the second user account, as the creator of the content portion, of a completion of the copy paste action by the user account.

14. The system of claim 9, wherein the method, executed by the at least one processor, further comprises: receiving a hover action over the live representation; and in response to the receiving of the hover action, automatically presenting a graphical user interface (GUI) element providing a data insight providing contextual data identifying a history of the copy paste action comprising: data identifying the user account that executed the copy paste action, a timestamp associated with the copy paste action, and contextual data identifying an edit history of the content portion of the distributed collaborative canvas.

15. The system of claim 9, wherein the method, executed by the at least one processor, further comprises: receiving a graphical user interface (GUI) element selection, associated with the live representation, that is configured to automatically convert the live representation to a static representation of the distributed collaborative canvas that displays only a current state of the content portion; and in response to receiving the GUI selection, automatically converting the live representation to the static representation.

16. The system of claim 9, wherein the live representation further comprises a graphical user interface (GUI) element that is configured to enable toggle control over expanding/collapsing the live representation, and wherein the method, executed by the at least one processor, further comprises: receiving a selection of the GUI element; and in response to receiving the selection of the GUI element, collapsing the live representation to remove, from display, the content of the live representation thereby displaying only the selectable data link associated with the distributed collaborative canvas.

17. A non-transitory computer-readable storage media storing computer-executable instructions that, when executed by at least one processor, causes the at least one processor to execute a method comprising:
    receiving an indication of a copy action, as part of a copy paste action, that copies a content portion from a distributed collaborative canvas presented in a first host service;
    in response to receiving the indication of the copy action, analyzing the copy action to determine a user account associated with the copy action and a navigation parameter identifying a content sub-range of the distributed collaborative canvas relative to an occurrence of the copy action;
    generating, based on an analysis of the copy action, a live representation of the distributed collaborative canvas that comprises:
    a selectable data link that links to the distributed collaborative canvas as original source content, and
    an editable version of the content portion, associated with the sub-content range of the navigation parameter, that is synchronized with the distributed collaborative canvas;
    receiving an indication of a paste action, as part of the copy paste action, that requests to paste the content potion, into a second host service, inline with content of the second host service; and
    in response to receiving the indication of the paste action, completing the copy paste action by automatically rendering the live presentation of the distributed collaborative canvas inline within the second host service.

18. The non-transitory computer-readable storage media of claim 17, wherein the indication of a copy action is a selection of a graphical user interface (GUI) element that is configured to automatically create a live link to the distributed collaborative canvas upon execution of the copy action, and wherein the generating of the live presentation of the distribute collaborative canvas occurs based on a trigger of detecting the selection of the GUI that is configured to automatically create the live link to the distributed collaborative canvas.

19. The non-transitory computer-readable storage media of claim 17, wherein the receiving of the indication of a copy action comprises detecting a keyboard command that is configured to automatically create a live link to the distributed collaborative canvas upon a detected entry of the keyboard command, and wherein the generating of the live representation of the distributed collaborative canvas occurs based on a trigger of detecting the keyboard command that is configured to automatically create the live link to the distributed collaborative canvas.

20. The non-transitory computer-readable storage media of claim 17, wherein the method, executed by the at least one processor, further comprising: receiving, from the second host service, an indication of an update to content of the live representation by the user account; and in response to receiving the indication of the update to the content of the live representation, automatically applying the update to the content to the distributed collaborative canvas.

\* \* \* \* \*